United States Patent
Kamiyama et al.

(10) Patent No.: US 9,438,073 B2
(45) Date of Patent: Sep. 6, 2016

(54) POWER SUPPLY SWITCHING CIRCUIT, REAL TIME CLOCK DEVICE, ELECTRONIC APPARATUS, MOBILE UNIT, AND METHOD OF CONTROLLING POWER SUPPLY SWITCHING CIRCUIT

(71) Applicant: Seiko Epson Corporation, Tokyo (JP)

(72) Inventors: Masayuki Kamiyama, Chino (JP); Hiroshi Kiya, Suwa (JP)

(73) Assignee: Seiko Epson Corporation (JP)

( * ) Notice: Subject to any disclaimer, the term of this patent is extended or adjusted under 35 U.S.C. 154(b) by 460 days.

(21) Appl. No.: 13/927,556

(22) Filed: Jun. 26, 2013

(65) Prior Publication Data

US 2014/0008984 A1 Jan. 9, 2014

(30) Foreign Application Priority Data

Jul. 9, 2012 (JP) ................................ 2012-153570

(51) Int. Cl.
  *H02J 9/06* (2006.01)
  *G06F 1/26* (2006.01)
  *G06F 1/30* (2006.01)

(52) U.S. Cl.
  CPC .................. *H02J 9/06* (2013.01); *G06F 1/263* (2013.01); *G06F 1/30* (2013.01); *Y10T 307/615* (2015.04); *Y10T 307/76* (2015.04); *Y10T 307/832* (2015.04)

(58) Field of Classification Search
  None
  See application file for complete search history.

(56) References Cited

U.S. PATENT DOCUMENTS

| | | | | |
|---|---|---|---|---|
| 5,739,596 A * | 4/1998 | Takizawa | ................ | G06F 1/263 307/64 |
| 6,016,017 A * | 1/2000 | Kadanka | ................ | H02J 9/061 307/64 |
| 6,624,673 B2 * | 9/2003 | Kim | ................ | G06F 1/24 327/143 |
| 6,879,134 B2 * | 4/2005 | Stanesti | ................ | H02J 7/0018 320/135 |
| 6,969,972 B2 * | 11/2005 | Formenti | ................ | G06F 1/263 320/128 |
| 7,391,184 B2 * | 6/2008 | Luo | ................ | H01M 10/441 307/48 |
| 7,564,220 B2 * | 7/2009 | Niculae | ................ | H02J 7/0013 320/131 |
| 8,350,532 B2 * | 1/2013 | Caraghiorghiopol | ... | G06F 1/263 320/140 |
| 8,575,917 B2 * | 11/2013 | Sims | ................ | G01R 31/40 324/120 |
| 2005/0017766 A1 | 1/2005 | Formenti | | |
| 2014/0001861 A1 * | 1/2014 | Mann | ................ | G06F 1/30 307/66 |

FOREIGN PATENT DOCUMENTS

| | | |
|---|---|---|
| JP | 2004364500 A | 12/2004 |
| JP | 2009-131129 | 6/2009 |
| JP | 2009-188862 | 8/2009 |

* cited by examiner

*Primary Examiner* — Rexford Barnie
*Assistant Examiner* — David Shiao
(74) *Attorney, Agent, or Firm* — Harness, Dickey & Pierce, P.L.C.

(57) ABSTRACT

A power supply switching circuit includes a switching circuit that electrically connects a VCC terminal and a VBK terminal in a connected state, a switch control circuit, and a power supply monitoring circuit that monitors a voltage of the VCC terminal, and outputs a voltage of the VBK terminal. The switch control circuit switches a mode from a normal mode in which the switching circuit is intermittently connected to a standby mode in which the switching circuit is opened according to an output signal of the power supply monitoring circuit.

12 Claims, 13 Drawing Sheets

POWER SUPPLY SWITCHING CIRCUIT, REAL TIME CLOCK DEVICE, ELECTRONIC APPARATUS, MOBILE UNIT, AND METHOD OF CONTROLLING POWER SUPPLY SWITCHING CIRCUIT

BACKGROUND

1. Technical Field

The present invention relates to a power supply switching circuit, a real time clock device, an electronic apparatus, a mobile unit, and a method of controlling the power supply switching circuit.

2. Related Art

A real time clock (RTC) circuit is a circuit having a timing function and incorporated in various electronic apparatuses such as a personal computer. Generally, the RTC circuit is required to continue timing even when a main power supply of the electronic apparatus is turned off or main power is not supplied temporarily due to instantaneous power interruption, and a power supply switching circuit for detecting shutdown of the main power supply and switching the power supply of the RTC circuit to a backup power supply is provided. As the backup power supply, a primary cell, a secondary cell, a high-capacity capacitor, or the like is used depending on the intended use. In the case where the secondary cell or the high-capacity capacitor is used as the backup power supply, the power supply switching circuit supplies main power to the RTC circuit and flows a current from the main power supply to the backup power supply for charging the backup power supply at the same time. For example, Patent Document 1 (JP-A-2009-188862) discloses a backup power supply circuit for switching the power supply of the RTC circuit using a secondary cell as a backup power supply. FIG. 15 is a configuration diagram of the backup power supply circuit described in Patent Document 1. A first voltage detection circuit VD1 detects a voltage of a main power supply terminal Vcc and, if the detected voltage is equal to or more than a first detection voltage, brings a first switch SW1 into connection (conduction). A second voltage detection circuit VD2 detects the voltage of the main power supply terminal Vcc and, if the detected voltage is equal to or more than a second detection voltage, brings a second switch SW2 to open (out of conduction). In short, the first switch SW1 is provided for switching the power supply of the RTC circuit to the backup power supply when the voltage of the main power supply is lower, and the second switch SW2 is provided for preventing overcharge of the backup power supply. According to the circuit having the above described configuration, normally, the main power may be supplied to the RTC circuit while the backup power supply is charged without overcharge, and, if the main power supply is shut down, a current flows from the main power supply terminal Vcc via a load circuit to the ground and the voltage of the main power supply terminal VCC is lower, and the first switch SW1 is opened and the power supply of the RTC circuit may be switched to the backup power supply.

However, in the circuit configuration described in Patent Document 1, in the case where the load of the load circuit is lighter, when the main power supply is shut down, a current flowing out from the main power supply terminal Vcc via the load circuit to the ground and a current flowing from the backup power supply into the main power supply terminal Vcc may be balanced and, as a result, the voltage of the main power supply terminal Vcc does not become lower and the first switch SW1 remains connected, and a problem that the charge accumulated in the backup power supply is wastefully consumed or an unstable condition that a control CPU is not completely turned off is caused arises. By increasing a resistance value of a protective resistor, the balance between the current flowing out from the main power supply terminal Vcc via the load circuit to the ground and the current flowing from the backup power supply into the main power supply terminal Vcc may be lost and discharge may be easier, however, the charging time of the backup power supply becomes longer.

SUMMARY

An advantage of some aspects of the invention is to provide a power supply switching circuit, a real time clock device, an electronic apparatus, a mobile unit, and a method of controlling the power supply switching circuit that enables switching to a backup power supply promptly when a main power supply is shut down.

The invention can be implemented as the following forms or application examples.

Application Example 1

This application example of the invention is directed to a power supply switching circuit including a power supply monitoring circuit that monitors a voltage of a first power supply node, a switching circuit that electrically connects the first power supply node and a second power supply node in a connected state, and a switch control circuit that switches a mode from a first mode in which the switching circuit is intermittently connected to a second mode in which the switching circuit is opened according to an output signal of the power supply monitoring circuit, and outputs a voltage of the second power supply node.

For example, the switch control circuit may select the first mode if the voltage of the first power supply node is higher than a predetermined voltage value, and select the second mode if the voltage of the first power supply node is lower than the predetermined voltage value.

According to the power supply switching circuit of the application example, the switching circuit is intermittently connected (accordingly, intermittently opened) in the first mode, and, if the power supply connected to the first power supply node is shut down, the current flowing from the power supply connected to the second power supply node into the first power supply node is interrupted at regular intervals. Therefore, the balance between the current flowing into the first power supply node and the current flowing out from the first power supply node via a load to the ground is lost and discharge and voltage reduction of the first power supply node are promoted. As a result, the voltage reduction of the first power supply node may be reliably detected by the power supply monitoring circuit, and the mode may be shifted to the second mode more quickly and the power supply voltage of the power supply connected to the second power supply node may be output.

Further, the switch control circuit may variably control a time in which the switching circuit is intermittently connected in the first mode based on the set value. In this manner, the time in which the switching circuit is intermittently connected may be adjusted to an appropriate time in response to a configuration of a system using the power supply switching circuit according to the application example.

Application Example 2

The power supply switching circuit according to the application example described above may be configured such that the power supply monitoring circuit monitors the voltage of the first power supply node when the switching circuit is opened in the first mode.

According to the power supply switching circuit of this application example, the power supply monitoring circuit operates only while the switching circuit is opened in the first mode, and thereby, current consumption by the power supply monitoring circuit may be reduced. Further, if the power supply connected to the first power supply node is shut down in the first mode, when the switching circuit is opened, the current flowing into the first power supply node is nearly zero and the discharge and the voltage reduction of the first power supply node are promoted, and thereby, the power supply monitoring circuit easily detects the voltage reduction of the first power supply node.

Further, the power supply monitoring circuit may intermittently monitor the voltage of the first power supply node in the second mode. In this manner, the current consumption by the power supply monitoring circuit may be further reduced.

Application Example 3

The power supply switching circuit according to the application example described above may be configured such that the switching circuit includes a switch element having a parasitic diode, the switch element is provided with an anode side of the parasitic diode at the first power supply node side and a cathode side of the parasitic diode at the second power supply node side, and the switch control circuit connects the switch element for connecting the switching circuit and open the switch element for opening the switching circuit.

According to the power supply switching circuit of this application example, in the first mode, the switch element is intermittently on (accordingly, intermittently opened) and the switch element functions as a forward diode when being opened. Therefore, in the first mode, a current flows from the first power supply node to the second power supply node regardless of connection/opening of the switching circuit. As a result, in the first mode, a desired voltage in response to the voltage of the first power supply node may be output from the second power supply node (thereby, for example, power supply to an RTC circuit may be continued), and, when a rechargeable power supply is connected to the second power supply node, the power supply may be continuously charged.

Application Example 4

The power supply switching circuit according to the application example described above may include a pull-down resistor electrically connected to the first power supply node.

According to the power supply switching circuit of this application example, if the power supply connected to the first power supply node is shut down, a current may be forcibly flown out from the first power supply node via the pull-down resistor. Therefore, the balance between the current flowing into the first power supply node and the current flowing out from the first power supply node is easily lost and the voltage reduction of the first power supply node is further promoted, and thereby, the power supply monitoring circuit detects the voltage reduction of the first power supply node more easily. As a result, if the power supply connected to the first power supply node is shut down, the mode may be shifted to the second mode more quickly and unwanted consumption of the power supply connected to the second power supply node may be suppressed.

Further, a pull-down resistor and a switch may be connected in series to the first power supply node, and the switch control circuit may intermittently connect/open the switch. In this manner, the current consumed in the pull-down resistor may be reduced.

Application Example 5

The power supply switching circuit according to the application example described above may be configured such that the switching circuit serves as a first switching circuit, the power supply switching circuit includes a second switching circuit that electrically connects the second power supply node and a third power supply node in a connected state, and the switch control circuit intermittently connects both the first switching circuit and the second switching circuit in the first mode, and opens the first switching circuit and connects the second switching circuit in the second mode.

According to the power supply switching circuit of this application example, in the first mode, both the first switching circuit and the second switching circuit are intermittently connected (accordingly, intermittently opened), and, if the power supply connected to the first power supply node is shut down, the current flowing from the power supply connected to the third power supply node into the first power supply node may be interrupted at regular intervals. Therefore, the balance between the current flowing into the first power supply node and the current flowing out from the first power supply node via a load to the ground is lost and the discharge and the voltage reduction of the first power supply node are promoted. As a result, the voltage reduction of the first power supply node may be reliably detected by the power supply monitoring circuit, the mode may be shifted to the second mode more quickly, and the power supply voltage of the power supply connected to the third power supply node may be output from the second power supply node.

Application Example 6

The power supply switching circuit according to the application example described above may be configured such that the power supply monitoring circuit serves as a first power supply monitoring circuit, the power supply switching circuit includes a second power supply monitoring circuit that monitors a voltage of the third power supply node, and the control circuit switches the mode from the first mode to a third mode in which the first switching circuit is connected and the second switching circuit is opened according to an output signal of the second power supply monitoring circuit.

For example, the switch control circuit may select the first mode if the voltage of the third power supply node is lower than a predetermined voltage value, and select the third mode if the voltage of the third power supply node is higher than the predetermined voltage value.

According to the power supply switching circuit of the application example, for example, when the voltage of the third power supply node becomes a desired voltage in the first mode, the mode may be switched to the third mode for opening the second switching circuit, and thereby, when a rechargeable power supply is connected to the third power supply node, overcharge of the power supply may be prevented. Further, in the case where the first power supply node includes a battery or the like, the third power supply voltage may not be affected by the drop of the first power supply voltage.

Further, the first power supply monitoring circuit may intermittently monitor the voltage of the first power supply node in the third mode. In this manner, the current consumption by the first power supply monitoring circuit may be reduced.

Furthermore, the second power supply monitoring circuit may monitor the voltage of the third power supply node when the second switching circuit is off in the first mode, may not monitor the voltage of the third power supply node in the second mode, or may intermittently monitor the voltage of the third power supply node in the third mode. In this manner, the current consumption by the second power supply monitoring circuit may be reduced.

Application Example 7

The power supply switching circuit according to the application example described above may be configured such that the power supply switching circuit includes a third power supply monitoring circuit that monitors a magnitude relationship between the voltage of the first power supply node and the voltage of the third power supply node, and the control circuit switches the mode from the first mode to the third mode according to an output signal of the third power supply monitoring circuit.

According to the power supply switching circuit of this application example, for example, in the first mode, if the voltage of the third power supply node is higher than the voltage of the first power supply node, the mode maybe shifted to the third mode and the second switching circuit may be opened. Therefore, when a rechargeable power supply is connected to the third power supply node, even if the power supply is not fully charged, at the time when the voltage of the power supply connected to the first power supply node starts to be lower than that of the third power supply node, the reverse flow of the current from the power supply connected to the third power supply node may be prevented. Therefore, if the power supply connected to the first power supply node is shut down or the voltage starts to fall, both stopping connection to the power supply connected to the third power supply node (stopping charging) or switching to the third power supply may be efficiently performed without waste.

Further, the third power supply monitoring circuit may monitor the voltage of the third power supply node when the second switching circuit is opened in the first mode, may not monitor the voltage of the third power supply node in the second mode, or intermittently monitor the voltage of the third power supply node in the third mode. In this manner, the current consumption by the third power supply monitoring circuit may be reduced.

Application Example 8

The power supply switching circuit according to the application example described above may be configured such that the switch element serves as a first switch element, the second switching circuit includes a second switch element and a third switch element having parasitic diodes, the second switch element is provided with an anode side of the parasitic diode at the second power supply node side and a cathode side at the third power supply node side, the third switch element is provided in series with the second switch element with an anode side of the parasitic diode at the third power supply node side and a cathode side at the second power supply node side, and the switch control circuit turns on both the second switch element and the third switch element for connecting the second switching circuit and opens the second switch element and connects the third switch element for opening the second switching circuit in the first mode.

According to the power supply switching circuit of the application example, in the first mode, while the third switch element remains connected, both the first switching circuit and the second switching circuit are intermittently connected (accordingly, intermittently opened) in the first mode, and, when the first switch element and the second switch element are opened, they function as forward diodes. Therefore, in the first mode, a current flows from the first power supply node via the second power supply node to the third power supply node regardless of connection/opening of the first switching circuit and the second switching circuit. As a result, in the first mode, a desired voltage in response to the voltage of the first power supply node may be output from the second power supply node, and, when a rechargeable power supply is connected to the third power supply node, the power supply may be continuously charged.

Application Example 9

This application example of the invention is directed to a real time clock device including any of the power supply switching circuits described above, and a real time clock circuit to which an output voltage of the power supply switching circuit is supplied as a power supply voltage.

According to the real time clock device of this application example, if the voltage of the first power supply node becomes lower, the power supply voltage of the real time clock circuit may be promptly switched from the power supply voltage in response to the voltage of the first power supply node to the power supply voltage in response to the voltage of the second power supply node.

Application Example 10

This application example of the invention is directed to an electronic apparatus including any of the power supply switching circuits described above, a first power supply that supplies a power supply voltage to the first power supply node, and a second power supply electrically connected to the second power supply node or the third power supply node.

According to the electronic apparatus of this application example, if the first power supply is shut down, the power supply of various devices connected to the second power supply node may be promptly switched from the first power supply to the second power supply. Alternatively, the current flowing in from the second power supply node may be stopped after the first power supply starts to fall and before reaching a predetermined constant voltage.

Application Example 11

This application example of the invention is directed to a mobile unit including any one of the power supply switching circuits, a first power supply that supplies a power supply voltage to the first power supply node, and a second power supply electrically connected to the second power supply node or the third power supply node.

According to the mobile unit of the application example, if the first power supply is shut down, the power supply of various devices connected to the second power supply node may be promptly switched from the first power supply to the second power supply.

Application Example 12

This application example of the invention is directed to a method of controlling a power supply switching circuit including a power supply monitoring circuit that monitors a voltage of a first power supply node and a switching circuit that electrically connects the first power supply node and a second power supply node in a connected state, and outputting a voltage of the second power supply node. The method includes switching a mode from a first mode in which the switching circuit is intermittently connected to a second mode in which the switching circuit is opened according to an output signal of the power supply monitoring circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained in detail using the drawings. Note that the embodiments to be explained do not unduly limit the invention described in the appended claims. Further, all of the configurations to be explained below are not necessarily essential component elements of the invention.

1. Real Time Clock Device 1-1. First Embodiment

Figure 1:
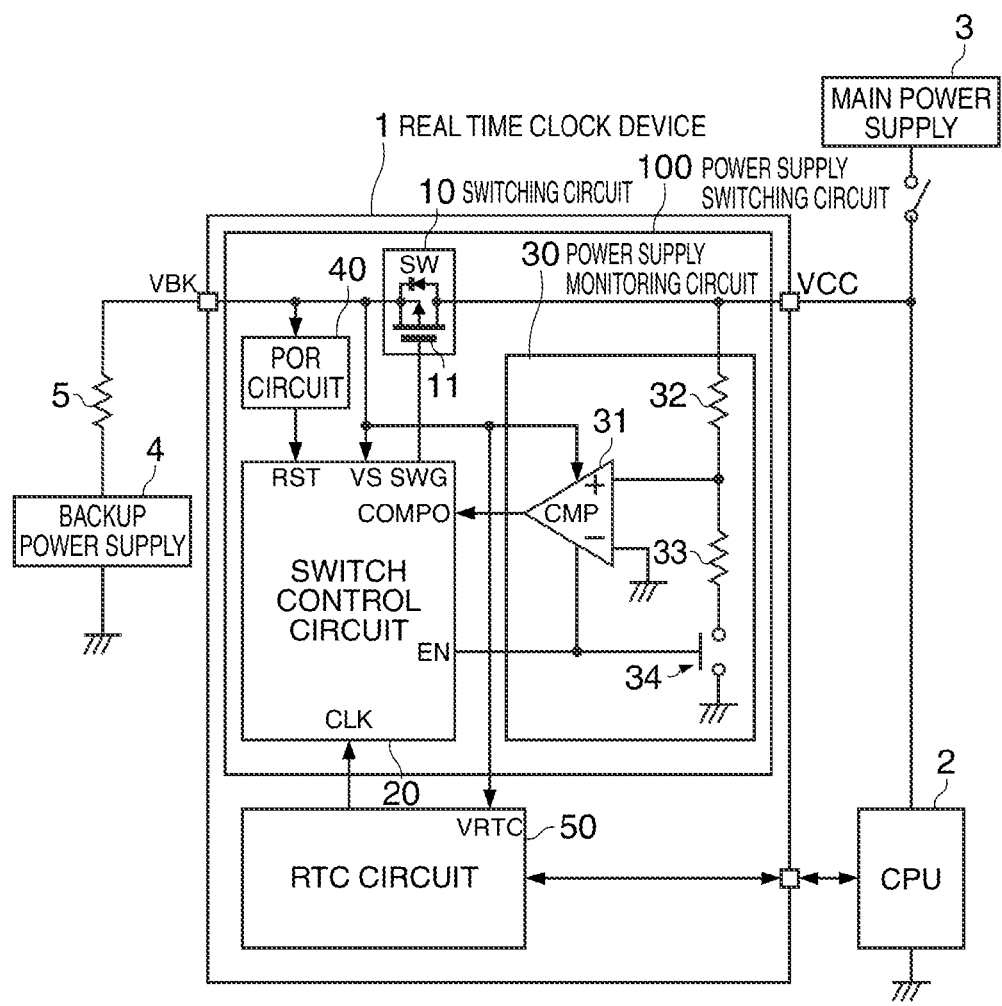
FIG. 1 shows a configuration example of a real time clock device of the first embodiment.

FIG. 1 shows a configuration example of a real time clock device of the first embodiment. A real time clock device 1 of the embodiment includes a real time clock (RTC) circuit 50 and a power supply switching circuit 100. Note that the real time clock device 1 of the embodiment may have a configuration in which part of these elements is omitted or changed or another element is added.

The real time clock device 1 of the embodiment has two power supply terminals of a VCC terminal and a VBK terminal. A main power supply is connected to the VCC terminal and a power supply voltage VCC is supplied from the main power supply. A limiting resistor 5 for limiting the charging rate and a backup power supply 4 such as a secondary cell or a high-capacity capacitor are connected to the VBK terminal.

The power supply switching circuit 100 includes a switching circuit 10, a switch control circuit 20, a power supply monitoring circuit 30, a power-on reset (POR) circuit 40. Note that the power supply switching circuit 100 of the embodiment may have a configuration in which part of these elements is omitted or changed or another element is added.

The switching circuit 10 electrically connects the VCC terminal (an example of a first power supply node) and the VBK terminal (an example of a second power supply node) in a connected state. In the embodiment, the switching circuit 10 includes a MOS transistor switch 11.

Suppose that the upstream side with respect to the direction in which a current flows is a source and the downstream side is a drain, the source and the drain of the MOS transistor switch 11 (an example of a switch element) are connected to the VCC terminal and the VBK terminal, respectively, and the source and the drain are brought into conduction (connection) or out of conduction (opened) in response to the gate voltage. In the embodiment, the MOS transistor switch 11 is a P-channel MOS transistor switch, and, if the gate voltage is at the low level, the switch is connected and, if the gate voltage is at the high level, the switch is opened. Note that the MOS transistor switch 11 has a parasitic diode (body diode) with an anode at the source side and a cathode at the drain side (the direction from the source to the drain is a forward direction) formed between the source and the drain, and, if a source potential is higher than a sum of a drain potential and a forward drop voltage VF of the parasitic diode, a current flows in the forward direction even in the open state.

The power supply monitoring circuit 30 is a circuit for monitoring the voltage of the VCC terminal (the power supply voltage VCC), and may be realized using a comparator 31 utilizing a difference between work functions of the MOS transistor, resistors 32, 33 and a switch 34, for example. In the embodiment, the power supply monitoring circuit 30 monitors the power supply voltage VCC and determines whether the voltage is higher or lower than a predetermined voltage value VDET, and outputs a binary signal at the high level if VCC is higher than VDET and at the low level if VCC is equal to or lower than VDET. The VDET is set to a lowest value of a guaranteed operating voltage of the real time clock device 1, and, if the power supply voltage VCC becomes lower due to failure, instantaneous power interruption, or the like, the output signal of the power supply monitoring circuit 30 becomes to the low level. Note that, in the embodiment, the power supply monitoring circuit 30 connects the switch 34 only at the time when an enable signal EN is input from the switch control circuit 20 and determines the voltage level of the power supply voltage VCC by activating the comparator 31.

The switch control circuit 20 is a circuit for controlling times of connection/opening of the switching circuit 10 and connection/opening of the operation of the power supply monitoring circuit 30. Specifically, the switch control circuit 20 has a state machine that transitions in synchronization with a timing signal (clock signal CLK) generated by the real time clock (RTC) circuit 50, and generates a switch control signal SWG for controlling the connection/opening of the MOS transistor switch 11 and an enable signal EN for allowing power supply monitoring circuit 30 to perform monitoring operation of the power supply voltage VCC in response to the state of the state machine.

Specifically, in the embodiment, the switch control circuit 20 switches between a normal mode (an example of a first mode) and a backup mode (an example of a second mode) according to an output signal CMPO of the power supply monitoring circuit 30. The switch control circuit 20 intermittently connects the switching circuit 10 by bringing the switch control signal SWG to the low level and allows the power supply monitoring circuit 30 to intermittently monitor the power supply voltage VCC by bringing the enable signal EN to the high level when the switching circuit 10 is opened in a normal mode. Further, the switch control circuit 20 constantly opens the switching circuit 10 by fixing the switch control signal SWG to the high level and allows the power supply monitoring circuit 30 to intermittently monitor the power supply voltage VCC by intermittently bringing the enable signal EN to the high level in a backup mode. In this manner, the power supply monitoring circuit 30 is allowed to intermittently perform monitoring operation, and thereby, the currents consumed in the comparator 31 and the resistors 32, 33 may be reduced.

Then, if the output signal CMPO of the power supply monitoring circuit 30 becomes to the low level (i.e., if power supply voltage VCC≤VDET) when the enable signal EN is at the high level in the normal mode, the switch control circuit 20 shifts to the backup mode and, if the output signal CMPO of the power supply monitoring circuit 30 becomes to the high level (i.e., if power supply voltage VCC>VDET) when the enable signal EN is at the high level in the backup mode, the circuit returns to the normal mode.

When the supply of the main power is started to the VCC terminal, the power-on reset (POR) circuit 40 generates a reset pulse with the rise of the power supply voltage. The switch control circuit 20 receives the reset pulse RST and sets the internal state to an initial state ("standby state 1" to be described later).

The power supply switching circuit 100 having the above described configuration outputs the voltage of the node at the VBK terminal side of the switching circuit 10 (the drain voltage of the MOS transistor switch 11) as a power supply voltage VRTC of the real time clock (RTC) circuit 50.

The real time clock (RTC) circuit 50 is a circuit for generating time information (information of year, month, day, hour, minute, second, etc.), and the CPU 2 can read out the time information from the real time clock (RTC) circuit 50 via an external terminal of the real time clock device 1. In the embodiment, a common power supply voltage is supplied from the main power supply 3 to the real time clock device 1 and the CPU 2.

The real time clock device 1 having the above described configuration may be realized as a one-chip semiconductor integrated circuit (IC).

Next, an example of a switch control procedure using the switch control circuit 20 will be explained in detail. In the following explanation, the MOS transistor switch 11 will be referred to as "switch SW".

Figure 2:
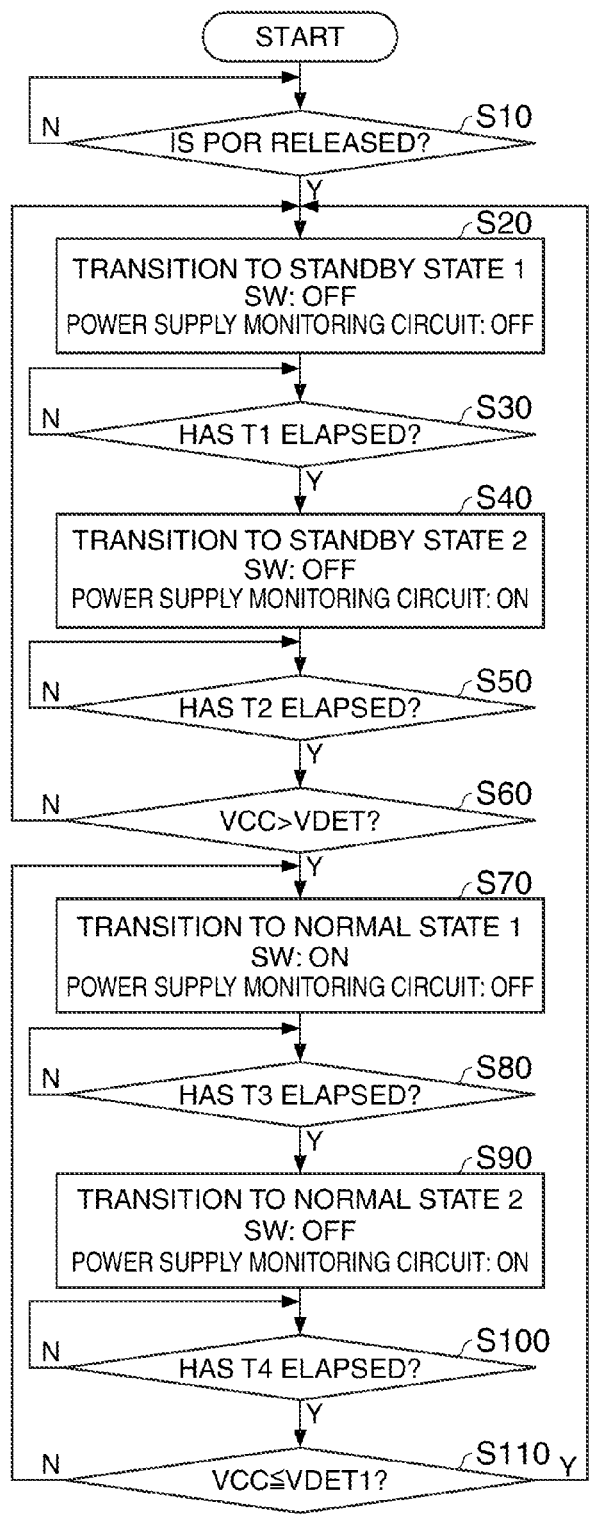
FIG. 2 is a flowchart showing an example of a control procedure using a switch control circuit in the first embodiment.

FIG. 2 is a flowchart showing the example of the control procedure using the switch control circuit 20. As shown in FIG. 2, if the power-on reset is released (Y at S10), the switch control circuit 20 initializes the internal state to the standby state 1 (S20).

In the standby state 1, the switch control circuit 20 opens the switch SW by bringing the switch control signal SWG to the high level and opens the power supply monitoring circuit 30 by bringing the enable signal EN to the low level.

Then, if a predetermined time T1 has elapsed (Y at S30), the switch control circuit 20 transitions the internal state to a standby state 2 (S40). The switch control circuit 20, in the standby state 2, connects the power supply monitoring circuit 30 by bringing the enable signal EN to the high level with the switch SW opened.

Then, if a predetermined time T2 has elapsed (Y at S50) and VCC≤VDET (the output signal CMPO of the power supply monitoring circuit 30 is at the low level) (N at S60), the switch control circuit 20 transitions the internal state to the standby state 1 again (S20), and, if VCC>VDET (the output signal CMPO of the power supply monitoring circuit 30 is at the high level) (Y at S60), the circuit transitions the internal state to a normal state 1 (S70).

The switch control circuit 20 connects the switch SW by bringing the switch control signal SWG to the low level and turns off the power supply monitoring circuit 30 by bringing the enable signal EN to the low level in the normal state 1.

In the normal state 1, the switch SW is connected, and thereby, if VBK is lower than VCC, a current flows from the VCC terminal to the VBK terminal via the switch SW. The current flows into the backup power supply 4 via the limiting resistor 5 and the backup power supply 4 is charged.

Then, if a predetermined time T3 has elapsed (Y at S80), the switch control circuit 20 transitions the internal state to a normal state 2 (S90). The switch control circuit 20 opens the switch SW by bringing the switch control signal SWG to the high level and connects the power supply monitoring circuit 30 by bringing the enable signal EN to the high level in the normal state 2.

In the normal state 2, the switch SW is opened, and thereby, while VBK is lower than (VCC−forward drop voltage VF of parasitic diode of switch SW), a current flows from the VCC terminal to the VBK terminal via the parasitic diode of the switch SW, and charging of the backup power supply 4 is continued. Further, if a voltage equal to or more than a predetermined operating voltage is supplied, the timing operation of the RTC circuit is also continued.

In addition, in the normal state 2, the switch SW is opened, and thereby, even when the power supply voltage VCC is lower than the voltage of the VBK terminal, the parasitic diode of the switch SW is inversely biased and the current charged in the backup power supply 4 does not flow into the VCC terminal.

Then, if a predetermined time T4 has elapsed (Y at S100) and VCC>VDET (the output signal CMPO of the power supply monitoring circuit 30 is at the high level) (N at S110), the switch control circuit 20 transitions the internal state to the normal state 1 again (S70), and, if VCC≤VDET (the output signal CMPO of the power supply monitoring circuit 30 is at the low level) (Y at S110), the circuit transitions the internal state to the standby state 1 (S10).

In the flowchart of FIG. 2, the predetermined times T1 to T4 may be variably set. For example, the respective set values of T1 to T4 may be stored in a nonvolatile memory (not shown) in FIG. 1, and the switch control circuit 20 may read out these set values from the memory and measure T1 to T4.

Note that, in the flowchart of FIG. 2, the normal states 1, 2 correspond to "normal mode" and the standby states 1, 2 correspond to "backup mode".

Figure 3:
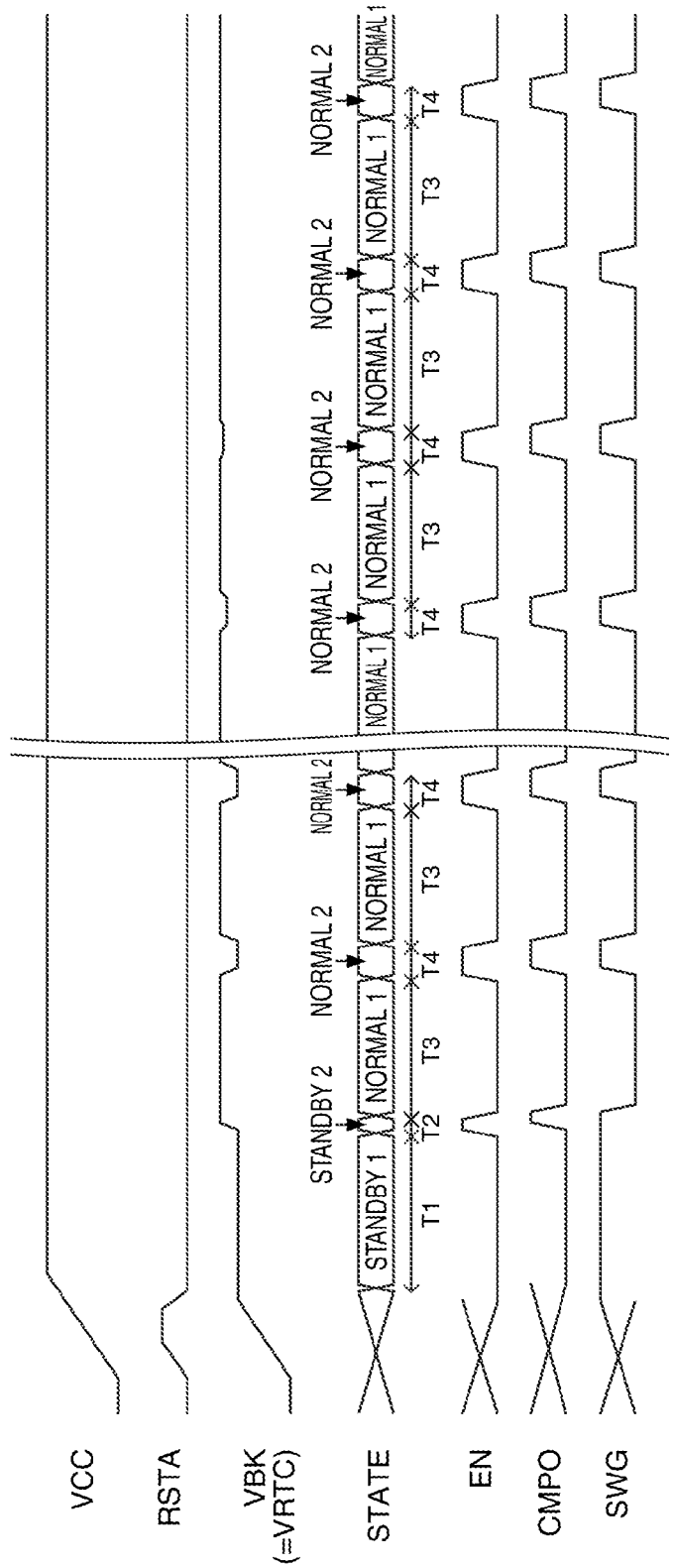
FIG. 3 shows an example of a timing chart in the first embodiment.
Figure 4:
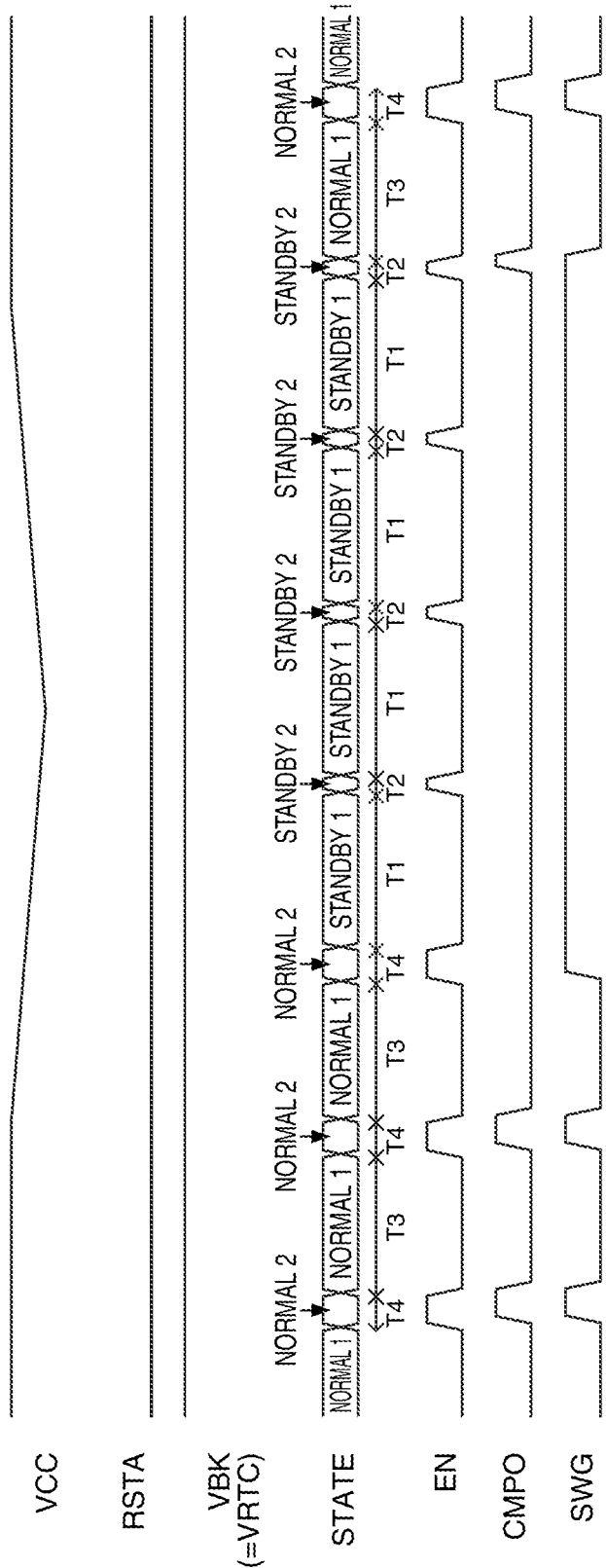
FIG. 4 shows an example of the timing chart in the first embodiment.

FIG. 3 shows an example of a timing chart from when the main power supply 3 is turned on to when the backup power supply 4 is fully charged. Further, FIG. 4 shows an example of the timing chart, after the mode is switched from the normal mode to the backup mode due to reduction of the power supply voltage VCC, when the mode is returned from the backup mode to the normal mode due to increase of the power supply voltage VCC.

As explained above, according to the real time clock device of the first embodiment, in the normal mode, the MOS transistor switch 11 (switch SW) is intermittently connected/opened according to the timing signal generated by the real time clock (RTC) circuit 50. Therefore, when the main power supply 3 is shut down, the current flowing from the VBK terminal to the VCC terminal at the backup power supply 4 side is interrupted at regular intervals, and the balance between the current flowing into the VCC terminal and the current flowing out to the ground via the load of the CPU 2 or the like is lost and the voltage reduction of the VCC terminal is promoted. As a result, the voltage reduction of the VCC terminal is reliably detected by the power supply monitoring circuit 30, and the mode may be shifted to the backup mode more quickly.

Further, according to the real time clock device of the embodiment, in the normal mode, the switch SW is opened at regular intervals and the switch SW functions as a forward diode when it opens while the VBK is lower than VCC–VF. Therefore, until VBK exceeds VCC–VF, a current flows from the VCC terminal to the VBK terminal regardless of the connection/opening of the switch SW, and charging of the backup power supply 4 is constantly performed. Then, after VBK has exceeded VCC–VF, charging of the backup power supply 4 is performed when the switch SW is connected at regular intervals, and thereby, the backup power supply 4 may be fully charged. Therefore, the backup power supply 4 may be fully charged in a shorter charging time.

Furthermore, according to the real time clock device of the embodiment, in the normal mode, the power supply voltage VRTC of the real time clock (RTC) circuit 50 is VCC when the switch SW is connected and VCC–VF when the switch is opened until VBK exceeds VCC–VF, and, after VBK exceeds VCC–VF, is VCC when the switch SW is connected and VBK when the switch is opened. In short, in the normal mode, a voltage equal to or more than VCC–VF is constantly supplied as the power supply voltage VRTC. On the other hand, in the backup mode, the switch SW is constantly opened, and VBK is supplied as the power supply voltage VRTC. Therefore, the real time clock (RTC) circuit 50 may continue the timing operation without difficulty either in the normal mode or the backup mode.

In addition, according to the real time clock device of the embodiment, only when the switch SW is opened in the normal mode, intermittently in the standby mode, the power supply monitoring circuit 30 is connected, and thereby, the current consumption by the power supply monitoring circuit 30 may be reduced. Further, if the main power supply is shut down in the normal mode, when the switch SW is opened, the balance between the current flowing into the VCC terminal and the current flowing out from the VCC terminal is lost and discharge and voltage reduction of the VCC terminal are promoted, and thereby, the power supply monitoring circuit 30 easily detects the voltage reduction of the VCC terminal.

Note that, to reduce the current consumption by the power supply monitoring circuit 30, it is preferable to set the time in which the power supply monitoring circuit 30 is connected (T2, T4 in the flowchart of FIG. 2) as short as possible compared to the time in which the circuit is opened (T1, T3 in the flowchart of FIG. 2), however, to promote the voltage reduction of the VCC terminal when the main power supply is shut down, it is necessary to set the time in which the switch SW is opened in the normal mode (T4) to be longer to some degree. Therefore, it is desirable to adjust T1 to T4 to appropriate times in response to the configuration of the system using the real time clock device of the embodiment.

Further, according to the real time clock device of the embodiment, compared to the charging method of trickle charge or pulse charge, the risk that the backup power supply 4 is damaged by charging may be reduced.

Note that, in the embodiment, the explanation has been made with the rechargeable power supply as the backup power supply 4, however, the backup power supply 4 may be a primary cell.

1-2. Second Embodiment

Figure 5:
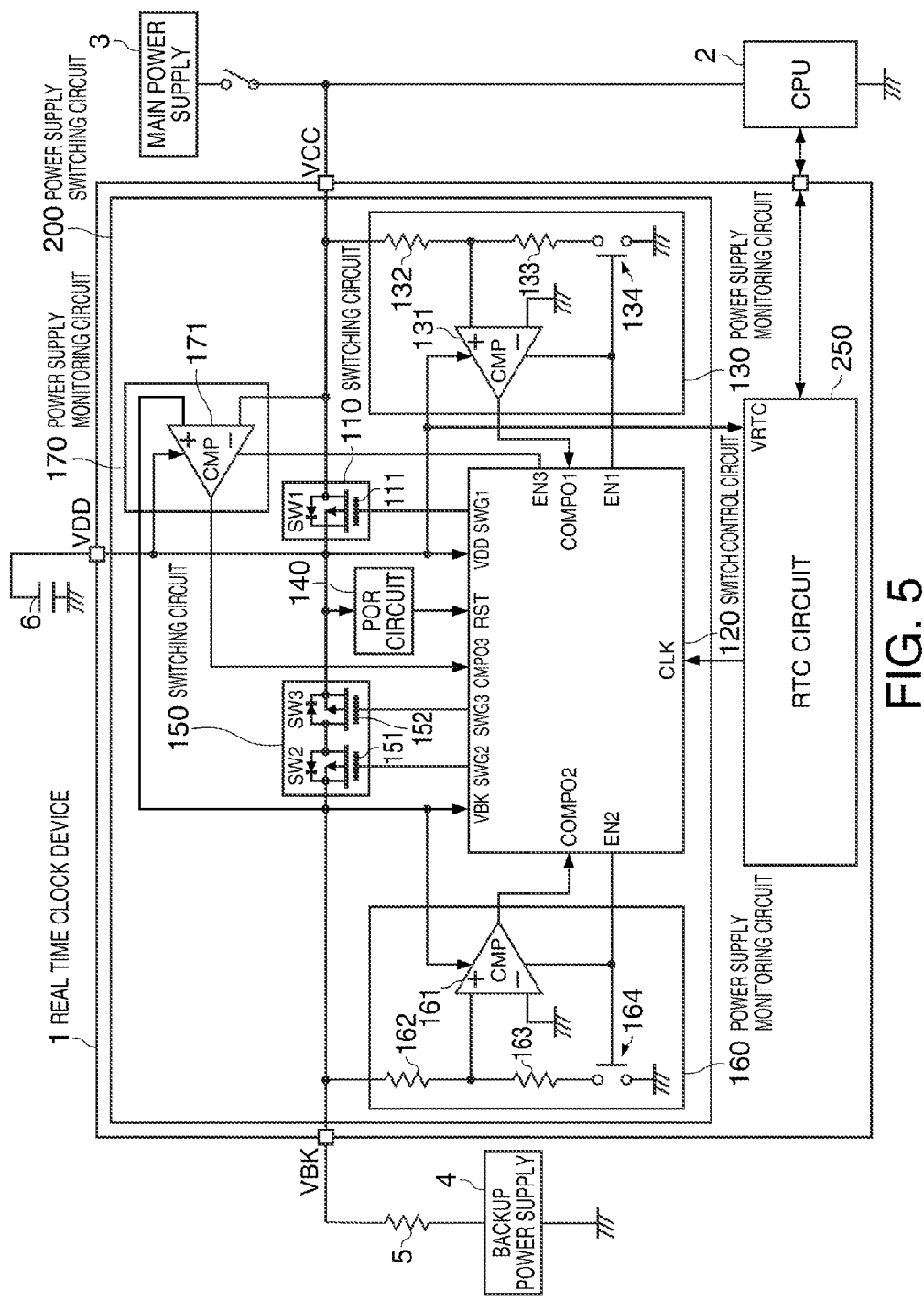
FIG. 5 shows a configuration example of a real time clock device of the second embodiment.

FIG. 5 shows a configuration example of a real time clock device of the second embodiment. The real time clock device 1 of the embodiment includes a real time clock (RTC) circuit 250 and a power supply switching circuit 200. Note that the real time clock device 1 of the embodiment may have a configuration in which part of these elements is omitted or changed or another element is added.

The real time clock device 1 of the embodiment has three power supply terminals of a VCC terminal, a VBK terminal, and a VDD terminal. A main power supply is connected to the VCC terminal and a power supply voltage VCC is supplied from the main power supply thereto. A limiting resistor 5 for limiting the charging rate and a backup power supply 4 such as a secondary cell or a high-capacity capacitor are connected to the VBK terminal. The VDD terminal is for outputting a power supply voltage supplied to a circuit and a device (not shown) and a smoothing capacitor 6 is connected between the VDD terminal and the ground.

The power supply switching circuit 200 includes a switching circuit 110, a switch control circuit 120, a power supply monitoring circuit 130, a power-on reset (POR) circuit 140, a switching circuit 150, a power supply monitoring circuit 160, and a power supply monitoring circuit 170. Note that the power supply switching circuit 200 of the embodiment may have a configuration in which part of these elements is omitted or changed or another element is added.

The switching circuit 110 (an example of a first switching circuit) electrically connects the VCC terminal (an example of the first power supply node) and the VDD terminal (an example of the second power supply node) by being a connected state. In the embodiment, the switching circuit 110 includes a MOS transistor switch 111.

The source and the drain of the MOS transistor switch 111 (an example of a first switch element) are connected to the VCC terminal and the VDD terminal, respectively, and the source and the drain are brought into conduction (connection) or out of conduction (opened) in response to the gate voltage. In the embodiment, the MOS transistor switch 111 is a P-channel MOS transistor switch, and, if the gate voltage is at the low level, the switch is connected and, if the gate voltage is at the high level, the switch is opened. Note that the MOS transistor switch 111 has a parasitic diode (body diode) with an anode at the source side and a cathode at the drain side (the direction from the source to the drain is a forward direction) formed between the source and the drain, and, if a source potential is higher than a sum of a drain potential and a forward drop voltage VF of the parasitic diode, a current flows in the forward direction even in the open state.

The power supply monitoring circuit 130 (an example of a first power supply monitoring circuit) is a circuit for monitoring the voltage of the VCC terminal (the power supply voltage VCC), and may be realized using a comparator 131 utilizing a difference between work functions of the MOS transistor, resistors 132, 133 and a switch 134, for example. In the embodiment, the power supply monitoring circuit 130 monitors the power supply voltage VCC and determines whether the voltage is higher or lower than a predetermined voltage value VDET1, and outputs a binary signal at the high level if VCC is higher than VDET1 and at the low level if VCC is equal to or lower than VDET1. The VDET1 is set to a lowest value of a guaranteed operating voltage of the real time clock device 1, and, if the power supply voltage VCC becomes lower due to failure or discharge of the main power supply using a battery, the output signal of the power supply monitoring circuit 130 becomes to the low level. Note that, in the embodiment, the power supply monitoring circuit 130 connects the switch 134 and determines the voltage level of the power supply voltage VCC by activating the comparator 131 only at the time when an enable signal EN1 is input from the switch control circuit 120.

The switching circuit 150 (an example of a second switching circuit) electrically connects the VDD terminal and the VBK terminal (an example of a third power supply node) in a connected state. In the embodiment, the switching circuit 150 includes a MOS transistor switch 151 and a MOS transistor switch 152 series-connected thereto.

The source and the drain of the MOS transistor switch 151 (an example of a second switch element) are connected to the source of the MOS transistor switch 152 and the VBK terminal, respectively, and the source and the drain are brought into conduction (connection) or out of conduction (opened) in response to the gate voltage.

The source and the drain of the MOS transistor switch 152 (an example of a third switch element) are connected to the source of the MOS transistor switch 151 and the VDD terminal, respectively, and the source and the drain are brought into conduction (connection) or out of conduction (opened) in response to the gate voltage.

In the embodiment, the MOS transistor switch 151 and the MOS transistor switch 152 are P-channel MOS transistor switches having parasitic diodes (body diodes) formed between the source and the drain like the MOS transistor switch 111. The MOS transistor switch 151 and the MOS transistor switch 152 may be replaced with each other at the VDD terminal side and the VBK terminal side, respectively.

The power supply monitoring circuit 160 (an example of a second power supply monitoring circuit) is a circuit for monitoring the voltage of the VBK terminal (the power supply voltage VBK), and may be realized using a comparator 161, resistors 162, 163 and a switch 164, for example. In the embodiment, the power supply monitoring circuit 160 monitors the power supply voltage VBK and determines whether the voltage is higher or lower than a predetermined voltage value VDET2, and outputs a binary signal at the high level if VBK is higher than VDET2 and at the low level if VBK is equal to or lower than VDET2. The VDET2 is set to a voltage value when a backup power supply 4 is fully charged, and, if the power supply voltage VBK becomes higher to a predetermined voltage value by the charging of the backup power supply 4, the output signal of the power supply monitoring circuit 160 becomes to the high level. Note that, in the embodiment, the power supply monitoring circuit 160 connects the switch 164 and determines the voltage level of the power supply voltage VBK by activating the comparator 161 only at the time when an enable signal EN2 is input from the switch control circuit 120.

The power supply monitoring circuit 170 (an example of a third power supply monitoring circuit) is a circuit for monitoring the magnitude relationship between the voltage of the VBK terminal (the power supply voltage VBK) and the VCC terminal (the power supply voltage VCC), and may be realized using a comparator 171, for example. In the embodiment, the power supply monitoring circuit 170 outputs a binary signal at the high level if VBK is higher than VCC and at the low level if VBK is equal to or lower than VCC. Note that, in the embodiment, the power supply monitoring circuit 170 determines the magnitude relationship between the power supply voltage VBK and the power supply voltage VCC by activating the comparator 171 only at the time when an enable signal EN3 is input from the switch control circuit 120.

The switch control circuit 120 is a circuit for controlling times of connection/opening of the switching circuits 110, 150 and connection/opening of the operation of the power supply monitoring circuit 130, 160, 170. Specifically, the switch control circuit 120 has a state machine that transitions in synchronization with a timing signal (clock signal CLK) generated by the real time clock (RTC) circuit 250, and generates switch control signals SWG1, SWG2, SWG3 for controlling on/opening of the MOS transistor switches 111, 151, 152 and enable signals EN1, EN2, EN3 for respectively allowing the power supply monitoring circuits 130, 160, 170 to perform monitoring operation in response to the state of the state machine.

Specifically, in the embodiment, the switch control circuit 120 switches between a normal mode (an example of the first mode) and a backup mode (an example of the second mode) according to an output signal CMPO1 of the power supply monitoring circuit 130, and switches between the normal mode and a charging stop mode (an example of a third mode) according to an output signal CMPO2 of the power supply monitoring circuit 160 and an output signal CMPO3 of the power supply monitoring circuit 170. Further, the switch control circuit 120 switches the mode from the charging stop mode to the backup mode according to the output signal CMPO1 of the power supply monitoring circuit 130.

The switch control circuit 120 intermittently connects the switching circuit 110 and the switching circuit 150 by intermittently bringing SWG1 and SWG2 to the low level while fixing the switch control signal SWG3 to the low level in the normal mode. Further, the switch control circuit 120 allows the power supply monitoring circuits 130, 160, 170 to intermittently perform monitoring operation by bringing the enable signals EN1, EN2, EN3 to the high level when the switching circuit 110 and the switching circuit 150 are opened in the normal mode.

The switch control circuit 120 constantly opens the switching circuit 110 by fixing the switch control signal SWG1 to the high level and constantly connects the switching circuit 150 by fixing the switch control signals SWG2, SWG3 to the low level in the backup mode. Further, the switch control circuit 120 allows the power supply monitoring circuit 130 to intermittently monitor the power supply voltage VCC by intermittently bringing the enable signal EN1 to the high level and stop the monitoring operation of the power supply monitoring circuits 160, 170 by fixing the enable signals EN2, EN3 to the low level in the backup mode.

The switch control circuit 120 constantly connects the switching circuit 110 by fixing the switch control signal SWG1 to the low level and constantly opens the switching circuit 150 by fixing the switch control signals SWG2, SWG3 to the high level in the charging stop backup mode. Further, the switch control circuit 120 allows the power supply monitoring circuits 130, 160, 170 to intermittently perform monitoring operation by intermittently bringing the enable signals EN1, EN2, EN3 to the high level in the charging stop mode.

In this manner, the power supply monitoring circuits 130, 160, 170 are allowed to intermittently perform monitoring operation in the normal mode and the charging stop mode and the power supply monitoring circuit 130 is allowed to intermittently perform monitoring operation and the power supply monitoring circuits 160, 170 are allowed to stop monitoring operation in the standby mode, and thereby, the currents consumed in the comparators 131, 161, 171 and the resistors 132, 133, 162, 163 may be reduced.

Then, if the output signal CMPO1 of the power supply monitoring circuit 130 becomes to the low level (i.e., if power supply voltage VCC≤VDET1) when the enable signal EN1 is at the high level in the normal mode or the charging stop mode, the switch control circuit 120 shifts to the backup mode and, if the output signal CMPO1 of the power supply monitoring circuit 130 becomes to the high level (i.e., if power supply voltage VCC>VDET1) when the enable signal EN1 is at the high level in the backup mode, the circuit returns to the normal mode.

Further, if the output signal CMPO2 of the power supply monitoring circuit 160 becomes to the high level (i.e., if power supply voltage VBK>VDET2) when the enable signal EN2 is at the high level in the normal mode, the switch control circuit 120 shifts to the charging stop mode and, if the output signal CMPO2 of the power supply monitoring circuit 160 becomes to the low level (i.e., if power supply voltage VBK≤VDET2) when the enable signal EN2 is at the high level in the charging stop mode, the circuit returns to the normal mode.

Furthermore, if the output signal CMPO3 of the power supply monitoring circuit 170 becomes to the high level (i.e., if power supply voltage VBK>VCC) when the enable signal EN3 is at the high level in the normal mode, the switch control circuit 120 shifts to the charging stop mode and, if the output signal CMPO3 of the power supply monitoring circuit 170 becomes to the low level (i.e., if power supply voltage VBK≤VCC) when the enable signal EN3 is at the high level in the charging stop mode, the circuit returns to the normal mode.

When the supply of the main power is started to the VCC terminal, the power-on reset (POR) circuit 140 generates a reset pulse with the rise of the power supply voltage. The switch control circuit 120 receives the reset pulse RST and sets the internal state to an initial state ("standby state 1" to be described later).

The power supply switching circuit 200 having the above described configuration outputs the voltage of the node at the VDD terminal side of the switching circuit 110 (the drain voltage of the MOS transistor switch 111) as a power supply voltage VRTC of the real time clock (RTC) circuit 250.

The real time clock (RTC) circuit 250 is a circuit for generating time information (information of year, month, day, hour, minute, second, etc.), and the CPU 2 can read out the time information from the real time clock (RTC) circuit 250 via an external terminal of the real time clock device 1. In the embodiment, a common power supply voltage is supplied from the main power supply 3 to the real time clock device 1 and the CPU 2.

The real time clock device 1 having the above described configuration may be realized as a one-chip semiconductor integrated circuit (IC).

Next, an example of a switch control procedure using the switch control circuit 120 will be explained in detail. In the following explanation, the MOS transistor switch 111, the MOS transistor switch 151, and the MOS transistor switch 152 will be referred to as "switch SW1", "switch SW2", "switch SW3", respectively. Further, the power supply monitoring circuit 130, the power supply monitoring circuit 160, the power supply monitoring circuit 170 will be referred to as "power supply monitoring circuit 1", "power supply monitoring circuit 2", "power supply monitoring circuit 3", respectively.

Figure 6:
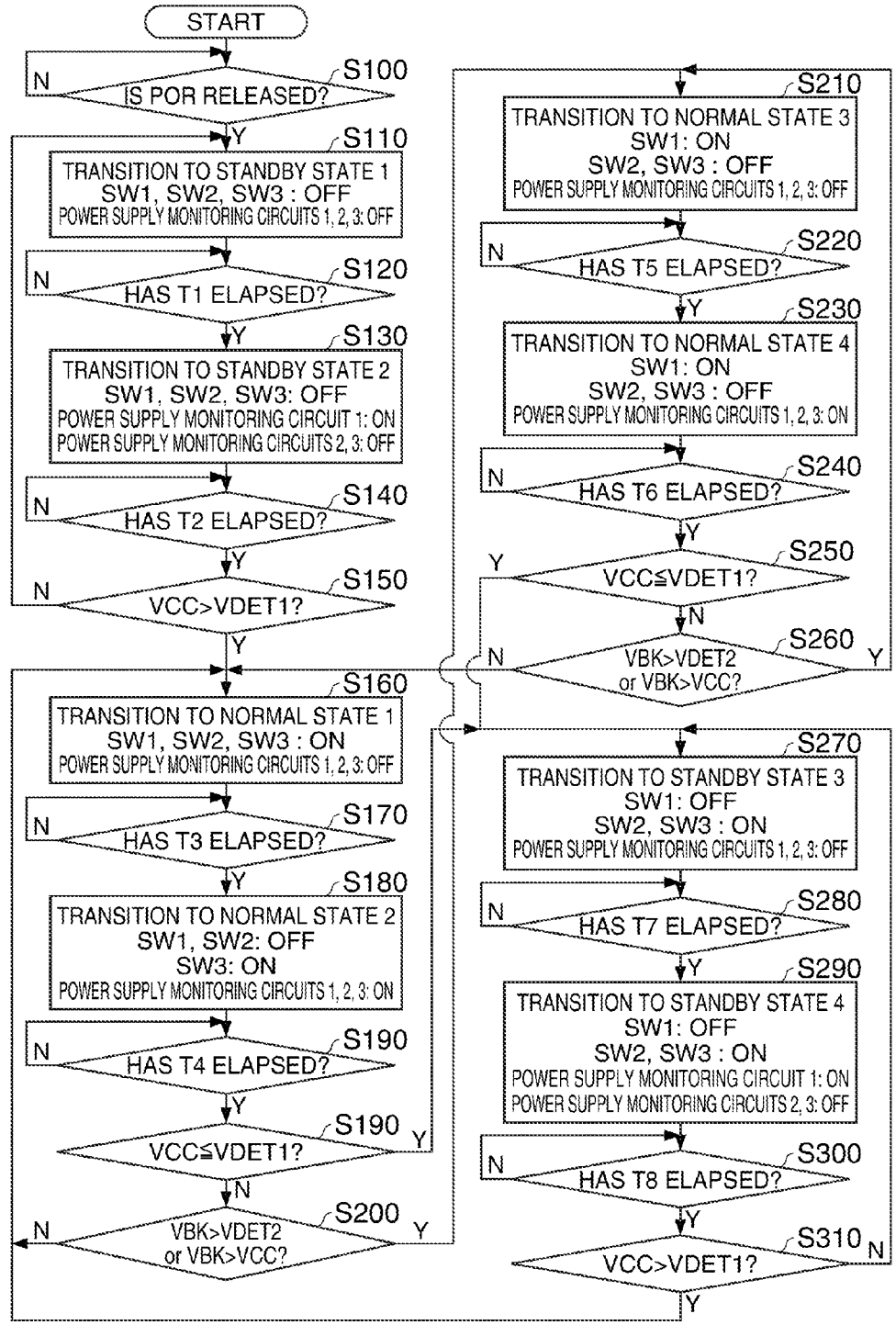
FIG. 6 is a flowchart showing an example of a control procedure using a switch control circuit in the second embodiment.

FIG. 6 is a flowchart showing the example of the control procedure using the switch control circuit 120. As shown in FIG. 6, if the power-on reset is released (Y at S100), the switch control circuit 120 initializes the internal state to the standby state 1 (S110).

The switch control circuit 120 opens all of the switches SW1, SW2, SW3 by bringing the switch control signals SWG1, SWG2, SWG3 to the high level and opens the power supply monitoring circuits 1, 2, 3 by bringing the enable signals EN1, EN2, EN3 to the low level in the standby state 1.

Then, if a predetermined time T1 has elapsed (Y at S120), the switch control circuit 120 transitions the internal state to a standby state 2 (S130). The switch control circuit 120 connects the power supply monitoring circuit 1 by bringing the enable signal EN1 to the high level with the switches SW1, SW2, SW3 opened and the power supply monitoring circuits 2, 3 opened.

Then, if a predetermined time T2 has elapsed (Y at S140) and VCC≤VDET1 (the output signal CMPO1 of the power supply monitoring circuit 1 is at the low level) (N at S150), the switch control circuit 120 transitions the internal state to the standby state 1 again (S110), and, if VCC>VDET1 (the output signal CMPO1 of the power supply monitoring circuit 1 is at the high level) (Y at S150), the circuit transitions the internal state to a normal state 1 (S160).

The switch control circuit 120 connects all of the switches SW1, SW2, SW3 by bringing the switch control signals SWG1, SWG2, SWG3 to the low level and opens all of the power supply monitoring circuits 1, 2, 3 by bringing the enable signals EN1, EN2, EN3 to the low level in the normal state 1.

In the normal state 1, all of the switches SW1, SW2, SW3 are connected, and thereby, if VBK is lower than VCC, a current flows from the VCC terminal to the VBK terminal via the switches SW1, SW2, SW3. The current flows into the backup power supply 4 via the limiting resistor 5 and the backup power supply 4 is charged.

Then, if a predetermined time T3 has elapsed (Y at S170), the switch control circuit 120 transitions the internal state to a normal state 2 (S180). The switch control circuit 120 opens the switches SW1, SW2 by bringing the switch control signals SWG1, SWG2 to the high level with the switch SW3 connected and connects all of the power supply monitoring circuits 1, 2, 3 by bringing the enable signals EN1, EN2, EN3 to the high level in the normal state 2.

In the normal state 2, the switches SW1, SW2 are opened with the switch SW3 connected, and thereby, while VBK is lower than (VCC−forward drop voltage VF1 of parasitic diode of switch SW1−forward drop voltage VF2 of parasitic diode of switch SW2), a current flows from the VCC terminal to the VBK terminal via the parasitic diode of the switch SW1, the channel of the switch SW3, and the parasitic diode of the switch SW2, and charging of the backup power supply 4 is continued.

Further, in the normal state 2, the switches SW1, SW2 are opened and, even when the power supply voltage VCC becomes lower than the voltage of the VBK terminal, both the parasitic diodes of the switches SW1, SW2 are inversely biased and the current charged in the backup power supply 4 does not flow into the VCC terminal.

Then, if a predetermined time T4 has elapsed (Y at S190) and VCC≤VDET1 (the output signal CMPO1 of the power supply monitoring circuit 1 is at the low level) (Y at S190), the switch control circuit 120 transitions the internal state to a standby state 3 (S270). On the other hand, if VCC>VDET1 (the output signal CMPO1 of the power supply monitoring circuit 1 is at the high level) (N at S190), the switch control circuit 120 transitions the internal state to a normal state 3 (S210) if VBK>VDET2 (the output signal CMPO2 of the power supply monitoring circuit 2 is at the high level) or VBK>VCC (the output signal CMPO3 of the power supply monitoring circuit 3 is at the high level) (Y at S200), and, otherwise, transitions the internal state to the normal state 1 again (S160).

In the normal state 3, the switch control circuit 120 connects the switch SW1 by bringing the switch control signal SWG1 to the low level and opens the switches SW2, SW3 by bringing the switch control signals SWG2, SWG3 to the high level, and opens all of the power supply monitoring circuits 1, 2, 3 by bringing the enable signals EN1, EN2, EN3 to the low level.

If a predetermined time T5 has elapsed in the normal state 3 (Y at S220), the switch control circuit 120 transitions the internal state to a normal state 4 (S230). The switch control circuit 120 connects all of the power supply monitoring circuits 1, 2, 3 by bringing the enable signals EN1, EN2, EN3 to the high level with the switch SW1 connected and the switches SW2, SW3 opened in the normal state 4.

In the normal state 3 and the normal state 4, the switch SW3 is opened and, even when VBK is lower than VCC, the parasitic diode of the switch SW3 is inversely biased and no current flows into the backup power supply 4 and the backup power supply 4 is not charged. Therefore, the VDET2 is set to the voltage when the backup power supply 4 is fully charged, and thereby, charging may be stopped immediately after the backup power supply 4 has been fully charged and overcharge of the backup power supply 4 may be prevented.

Further, in the normal state 3 and the normal state 4, the switch SW2 is opened and, even when the power supply voltage VCC becomes lower than the voltage of the VBK terminal, the parasitic diode of the switch SW2 is inversely biased and the current charged in the backup power supply 4 does not flow into the VCC terminal.

Then, if a predetermined time T6 has elapsed (Y at S240) and VCC≤VDET1 (the output signal CMPO1 of the power supply monitoring circuit 1 is at the low level) (Y at S250), the switch control circuit 120 transitions the internal state to the standby state 3 (S270). On the other hand, if VCC>VDET1 (the output signal CMPO1 of the power supply monitoring circuit 1 is at the high level) (N at S250), the switch control circuit 120 transitions the internal state to the normal state 3 again (S210) if VBK>VDET2 (the output signal CMPO2 of the power supply monitoring circuit 2 is at the high level) or VBK>VCC (the output signal CMPO3 of the power supply monitoring circuit 3 is at the high level) (Y at S260), and, otherwise, transitions the internal state to the normal state 1 again (S160).

In the standby state 3, the switch control circuit 120 opens the switch SW1 by bringing the switch control signal SWG1 to the high level and connects the switches SW2, SW3 by bringing the switch control signals SWG2, SWG3 to the low level, and opens all of the power supply monitoring circuits 1, 2, 3 by bringing the enable signals EN1, EN2, EN3 to the low level.

Then, if a predetermined time T7 has elapsed (Y at S280), the switch control circuit 120 transitions the internal state to a standby state 4 (S290). The switch control circuit 120 connects the power supply monitoring circuit 1 by bringing the enable signal EN1 to the high level with the switch SW1 opened, the switches SW2, SW3 connected, and the power supply monitoring circuits 2, 3 opened in the standby state 4.

Then, if a predetermined time T8 has elapsed (Y at S300) and VCC VDET1 (the output signal CMPO1 of the power supply monitoring circuit 1 is at the low level) (Y at S310), the switch control circuit 120 transitions the internal state to the standby state 3 again (S270), and, if VCC>VDET1 (the output signal CMPO1 of the power supply monitoring circuit 1 is at the high level) (N at S150), the switch control circuit 120 transitions the internal state to the normal state 1 again (S160).

In the flowchart of FIG. 6, the predetermined times T1 to T8 may be variably set. For example, the respective set values of T1 to T8 may be stored in a nonvolatile memory (not shown) in FIG. 5, and the switch control circuit 120 may read out these set values from the memory and measure T1 to T8.

Note that, in the flowchart of FIG. 6, the normal states 1, 2 correspond to "normal mode", the normal states 3, 4 correspond to "charging stop mode", and the standby states 3, 4 correspond to "backup mode".

Figure 7:
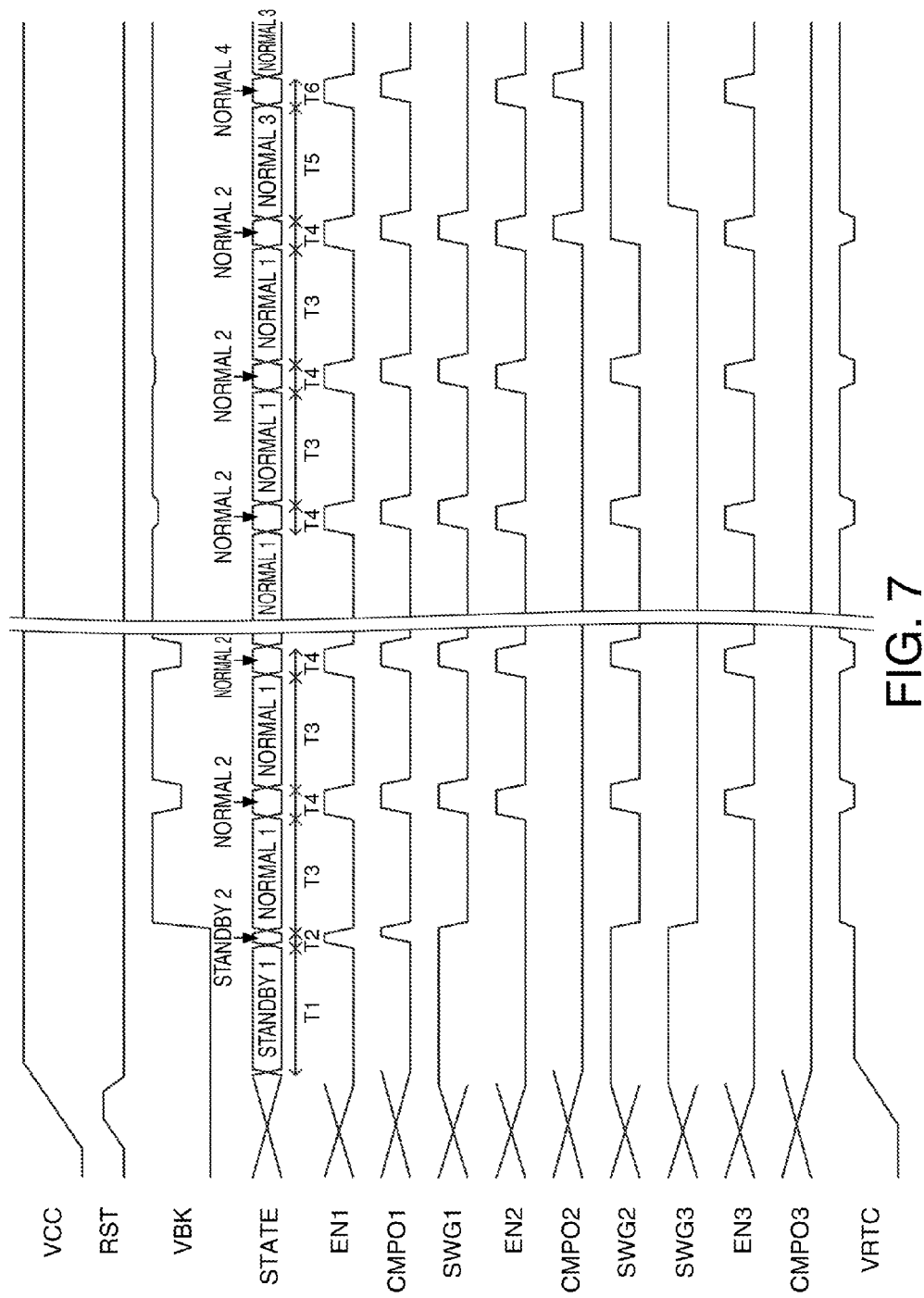
FIG. 7 shows an example of a timing chart in the second embodiment.
Figure 8:
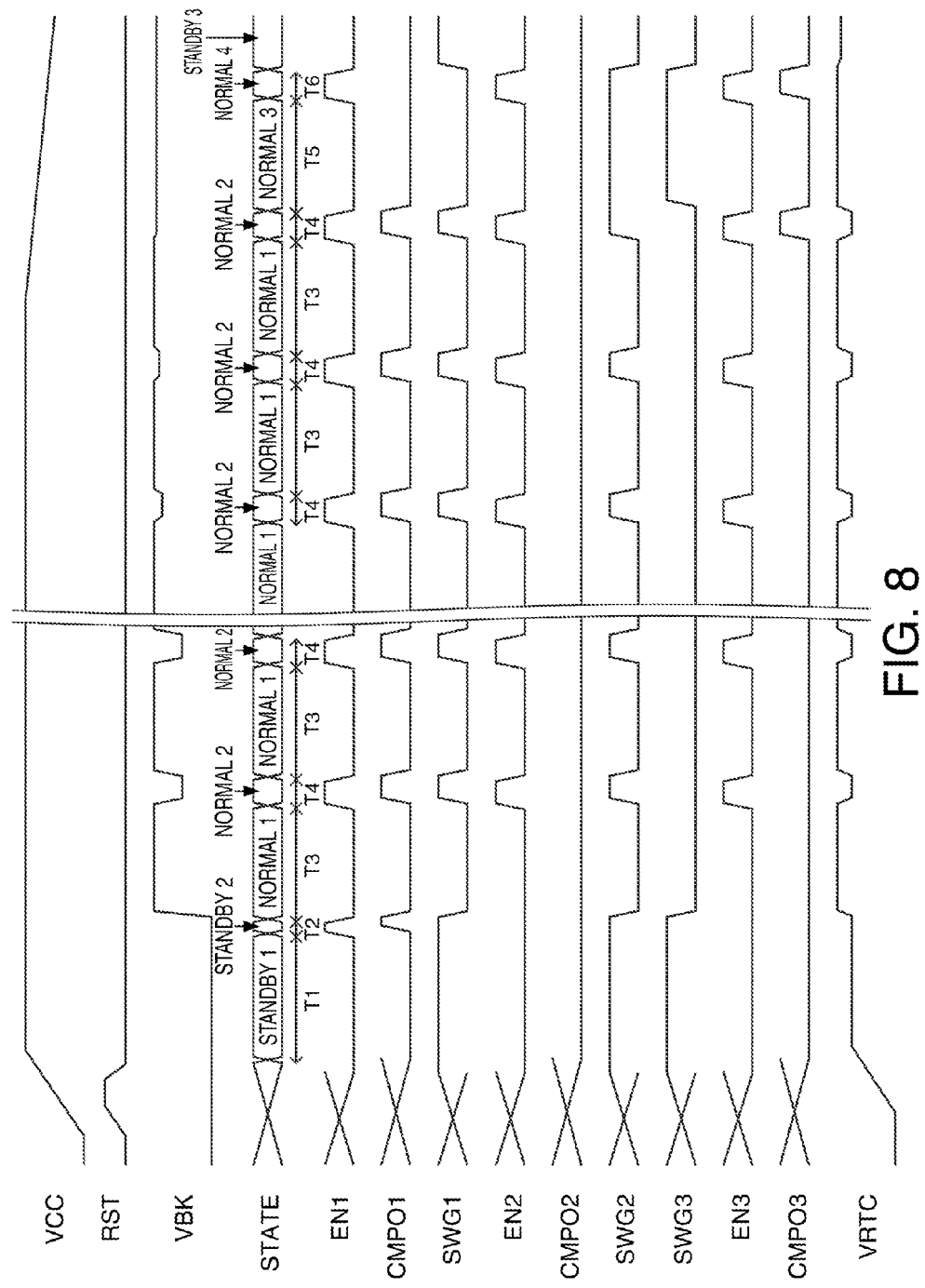
FIG. 8 shows an example of the timing chart in the second embodiment.
Figure 9:
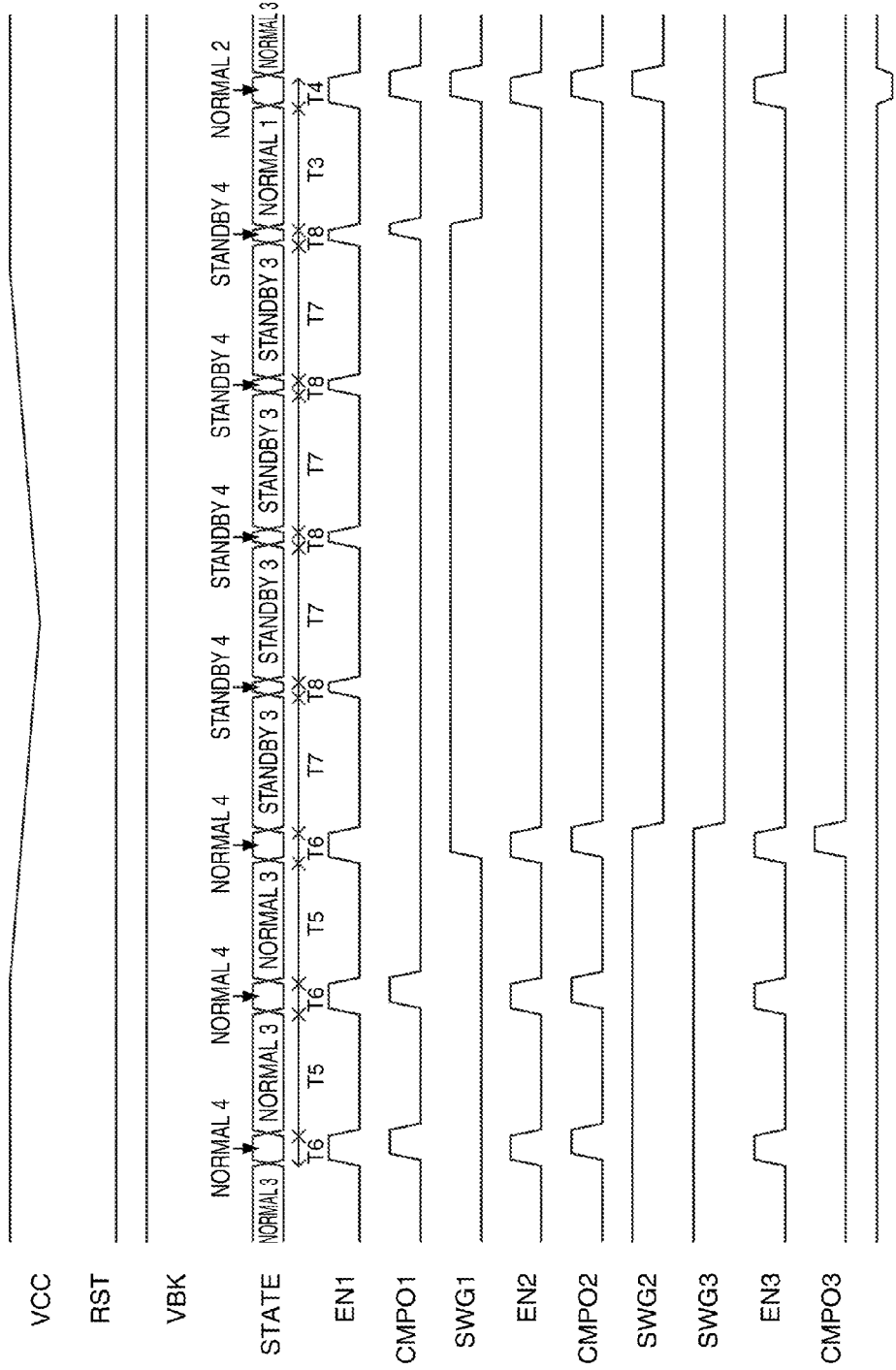
FIG. 9 shows an example of the timing chart in the second embodiment.
Figure 10:
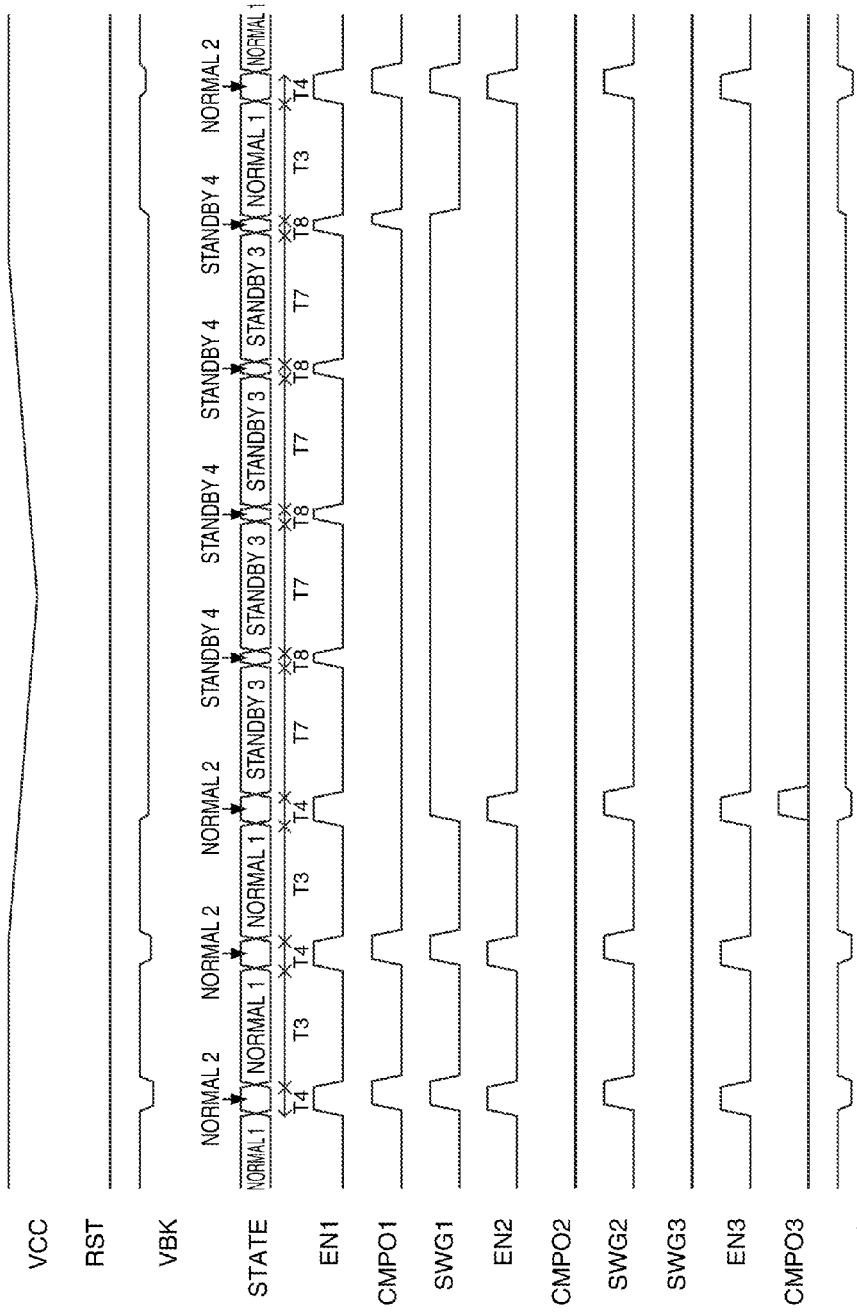
FIG. 10 shows an example of the timing chart in the second embodiment.

FIG. 7 shows an example of a timing chart from when the main power supply 3 is turned on to when the backup power supply 4 is fully charged. Further, FIG. 8 shows an example of the timing chart when the mode is switched to the charging stop mode due to reduction of the power supply voltage VCC before the backup power supply 4 is fully charged, and further switched to the backup mode. Furthermore, FIG. 9 shows an example of the timing chart, after the mode is switched from the charging stop mode to the backup mode due to reduction of the power supply voltage VCC, when the mode is returned from the backup mode to the normal mode due to increase of the power supply voltage VCC. In addition, FIG. 10 shows an example of the timing chart, after the mode is switched from the normal mode to the backup mode due to reduction of the power supply voltage VCC, when the mode is returned from the backup mode to the normal mode due to increase of the power supply voltage VCC.

As explained above, according to the real time clock device of the second embodiment, in the normal mode, the MOS transistor switches 111, 151 (switches SW1, SW2) are intermittently connected/opened according to the timing signal generated by the real time clock (RTC) circuit 250. Therefore, when the main power supply 3 is shut down, the current flowing from the VBK terminal into the VCC terminal at the backup power supply 4 side is interrupted at regular intervals, and the balance between the current flowing into the VCC terminal and the current flowing out to the ground via the load of the CPU 2 or the like is lost and the voltage reduction of the VCC terminal is promoted. As a result, the voltage reduction of the VCC terminal is reliably detected by the power supply monitoring circuit 130, and the mode may be shifted to the backup mode more quickly.

Further, according to the real time clock device of the embodiment, in the normal mode, the switches SW1, SW2 are opened at regular intervals with the switch SW3 connected, and the switches SW1, SW2 function as forward diodes when they open while VBK is lower than VCC−VF1−VF2. Therefore, until VBK exceeds VCC−VF1−VF2, a current flows from the VCC terminal to the VBK terminal regardless of the connection/opening of the switches SW1, SW2, and charging of the backup power supply 4 is constantly performed. Then, after VBK has exceeded VCC−VF1−VF2, charging of the backup power supply 4 is performed when the switches SW1, SW2 are connected at regular intervals, and thereby, the backup power supply 4 may be fully charged. Therefore, the backup power supply 4 may be fully charged in a shorter charging time.

Furthermore, according to the real time clock device of the embodiment, in the normal mode, the power supply voltage VRTC of the real time clock (RTC) circuit 250 (i.e., the voltage of the VDD terminal) is VCC when the switches SW1, SW2 are connected and VCC−VF1−VF2 when the switch is opened until VBK exceeds VCC−VF1−VF2, and, after VBK exceeds VCC−VF1−F2, is VCC when both of the switches SW1, SW2 are connected and VBK when both of the switches are opened. In short, in the normal mode, a voltage equal to or more than VCC−VF1−VF2 is constantly supplied as the power supply voltage VRTC (=VDD). On the other hand, in the charging stop mode, constantly, the switch SW1 is connected and both of the switches SW2, SW3 are opened, and VCC is supplied as the power supply voltage VRTC (=VDD), and, in the backup mode, constantly, the switch SW1 is opened and both of the switches SW2, SW3 are connected, and VBK is supplied as the power supply voltage VRTC (=VDD). Therefore, the real time clock (RTC) circuit 250 may continue the timing operation without difficulty in the normal mode, the charging stop mode, or the backup mode, and a device connected to the VDD terminal may continue predetermined processing.

In addition, according to the real time clock device of the embodiment, only when the switch SW is opened in the normal mode and only when both of the switches SW2, SW3 are opened in the charging stop mode, the power supply monitoring circuits 130, 160, 170 are connected, and, in the standby mode, the power supply monitoring circuits 160, 170 are constantly opened and the power supply monitoring circuit 130 is intermittently connected, and thereby, the current consumption by the power supply monitoring circuits 130, 160, 170 may be reduced. Further, if the main power supply is shut down, when one of or both the switch SW1 and the switch SW2 are opened, the balance between the current flowing into the VCC terminal and the current flowing out from the VCC terminal is lost and voltage reduction of the VCC terminal is promoted, and thereby, the power supply monitoring circuit 130 easily detects the voltage reduction of the VCC terminal.

Note that, to reduce the current consumption by the power supply monitoring circuits 130, 160, 170, it is preferable to set the time in which at least one of the circuits is connected (T2, T4, T6, T8 in the flowchart of FIG. 6) as short as possible compared to the time in which all of the power supply monitoring circuits 130, 160, 170 are opened (T1, T3, T5, T7 in the flowchart of FIG. 6), however, to promote the voltage reduction of the VCC terminal when the main power supply is shut down, it is necessary to set the time in which the switches SW1, SW2 are opened in the normal mode (T4) to be longer to some degree. Therefore, it is desirable to adjust T1 to T8 to appropriate times in response to the configuration of the system using the real time clock device of the embodiment.

Further, according to the real time clock device of the embodiment, if the voltage of the VBK terminal becomes higher than the voltage of the VCC terminal, the MOS transistor switches 151, 152 (switches SW2, SW3) are opened, if the backup power supply 4 has not been fully charged, the reverse flow of the current from the backup power supply 4 may be prevented at the time when the main power supply is shut down and the voltage reduction of the VCC terminal is started. Therefore, switching from the main power supply 3 to the backup power supply 4 may be efficiently performed without waste.

Furthermore, according to the real time clock device of the embodiment, compared to the charging method of trickle charge or pulse charge, the risk that the backup power supply 4 is damaged by charging may be reduced.

Note that, in the embodiment, the explanation has been made with the rechargeable power supply as the backup power supply 4, however, the backup power supply 4 may be a primary cell.

2. Electronic Apparatus

Figure 11:
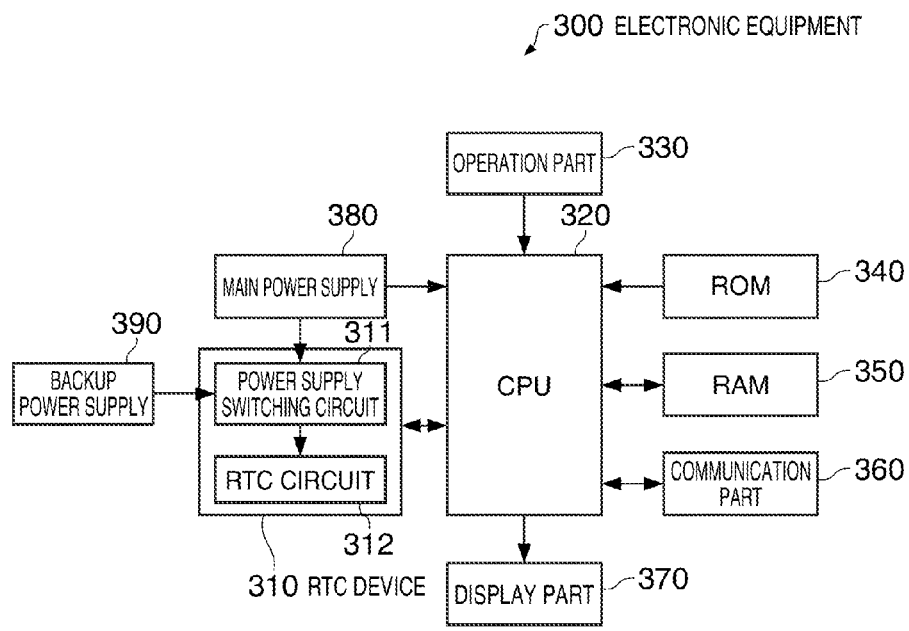
FIG. 11 is a functional block diagram of an electronic apparatus of the embodiment.
Figure 12:
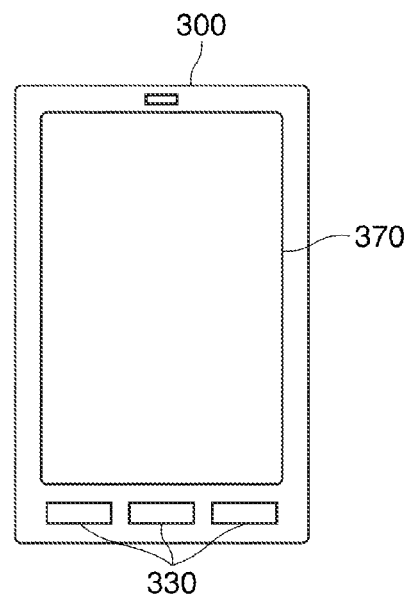
FIG. 12 shows an example of an appearance of the electronic apparatus of the embodiment.

FIG. 11 is a functional block diagram of an electronic apparatus of the embodiment. Further, FIG. 12 shows an example of an appearance of a smartphone as an example of the electronic apparatus of the embodiment.

An electronic apparatus 300 of the embodiment includes a real time clock (RTC) device 310, a CPU (Central Processing Unit) 320, an operation part 330, a ROM (Read Only Memory) 340, a RAM (Random Access Memory) 350, a communication part 360, a display part 370, a main power supply 380, and a backup power supply 390. Note that the electronic apparatus of the embodiment may have a configuration in which part of the component elements (respective parts) in FIG. 11 is omitted or changed or another element is added.

The real time clock device 310 includes a power supply switching circuit 311 and a real time clock (RTC) circuit 312 to which an output voltage of the power supply switching circuit 311 is supplied as a power supply voltage. For example, the device is a one-chip IC. The real time clock device 310 is either of the real time clock device 1 of the above described first embodiment or second embodiment, for example.

The main power supply 380 (an example of a first power supply) supplies a power supply voltage to a VCC terminal of the real time clock device 310. Further, the main power supply 380 also supplies the power supply voltage to the CPU 320.

The backup power supply 390 (an example of a second power supply) is electrically connected to a VBK terminal of the real time clock device 310 via a limiting resistor (not shown), for example.

If the power supply voltage of the main power supply 380 is higher than a predetermined voltage value, the power supply switching circuit 311 supplies the power supply voltage of the main power supply 380 to the RTC circuit 312, and, if the power supply voltage of the main power supply 380 is lower than the predetermined voltage value, the circuit switches the power supply voltage supplied to the RTC circuit 312 to the power supply voltage of the backup power supply 390.

The CPU 320 performs various calculation processing and control processing according to programs stored in the ROM 340 or the like. Specifically, the CPU 320 performs various processing in response to operation signals from the operation part 330, processing of controlling the communication part 360 for data communications with the outside, processing of transmitting display signals for displaying various information on the display part 370, etc.

The operation part 330 is an input device including an operation key, a button switch, etc., and outputs operation signals in response to operation by a user to the CPU 320.

The ROM 340 stores programs, data, etc. for the CPU 320 to perform various calculation processing and control processing.

The RAM 350 is used as a work area of the CPU 320, and temporarily stores programs and data read out from the ROM 340, data input from the operation part 330, computation results executed according to various programs by the CPU 320, etc.

The communication part 360 performs various controls for establishment of data communications between the CPU 320 and an external device.

The display part 370 is a display device including an LCD (Liquid Crystal Display) or the like, and displays various information based on display signals input from the CPU 320. A touch panel that functions as the operation part 330 may be provided on the display part 370.

By incorporation of the real time clock device 1 of the embodiment as the real time clock device 310, an electronic apparatus with more convenience may be realized.

Various electronic apparatuses may be considered as the electronic apparatus 300 and includes, for example, a personal computer (for example, a mobile personal computer, a laptop personal computer, a tablet personal computer), a mobile terminal such as a cellular phone, a digital still camera, an inkjet ejection device (for example, an inkjet printer), a storage area network device such as a router or a switch, a local area network device, a television, a video camera, a video tape recorder, a car navigation system, a pager, a personal digital assistance (with or without communication function), an electronic dictionary, a calculator, an electronic game machine, a game controller, a word processor, a work station, a videophone, a security television monitor, electronic binoculars, a POS terminal, a medical device (for example, an electronic thermometer, a sphygmomanometer, a blood glucose meter, an electrocardiographic measurement system, an ultrasonic diagnostic system, or an electronic endoscope), a fish finder, various measurement instruments, meters and gauges (for example, meters for vehicles, airplanes, and ships), a flight simulator, a head-mounted display, motion trace, motion tracking, motion controller, PDR (pedestrian dead reckoning), etc.

3. Mobile Unit

Figure 13:
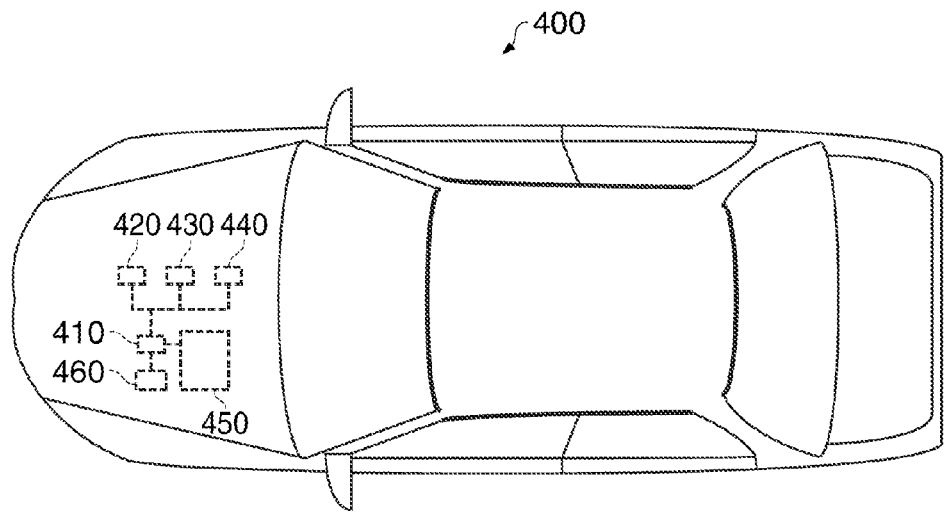
FIG. 13 shows an example of a mobile unit of the embodiment.

FIG. 13 shows an example of a mobile unit of the embodiment (in a top view). A mobile unit 400 shown in FIG. 13 includes a power supply switching circuit 410, controllers 420, 430, 440 for various control of an engine system, a brake system, a keyless entry system, etc., a battery 450, and a backup battery 460. Note that the mobile unit of the embodiment may have a configuration in which part of the component elements (respective parts) in FIG. 13 is omitted or changed or another element is added.

The power supply switching circuit 410 is the above described power supply switching circuit 200 of the second embodiment, for example.

The battery 450 (an example of the first power supply) supplies a power supply voltage to a VCC terminal of the power supply switching circuit 410.

The backup battery 460 (an example of the second power supply) is electrically connected to a VBK terminal of the power supply switching circuit 410 via a limiting resistor (not shown), for example.

The power supply voltage is supplied from a VDD terminal of the power supply switching circuit 410 to the controllers 420, 430, 440.

If the power supply voltage of the battery 450 is higher than a predetermined voltage value, the power supply switching circuit 410 outputs the power supply voltage of the battery 450 from the VDD terminal, and, if the power supply voltage of the battery 450 becomes lower than the predetermined voltage value, the circuit switches the output voltage from the VDD terminal to a power supply voltage of the backup battery 460.

As described above, by incorporation of the power supply switching circuit 410 of the embodiment into the mobile unit 400, a more reliable mobile unit may be realized.

Various mobile units are considered as the mobile unit 400 and include, for example, automobiles (including electric cars), airplanes such as jet planes and helicopters, boats and ships, rockets, satellites, etc.

4. Modified Examples

The invention is not limited to the embodiments and various modifications may be made without departing from the scope of the invention.

Figure 14:
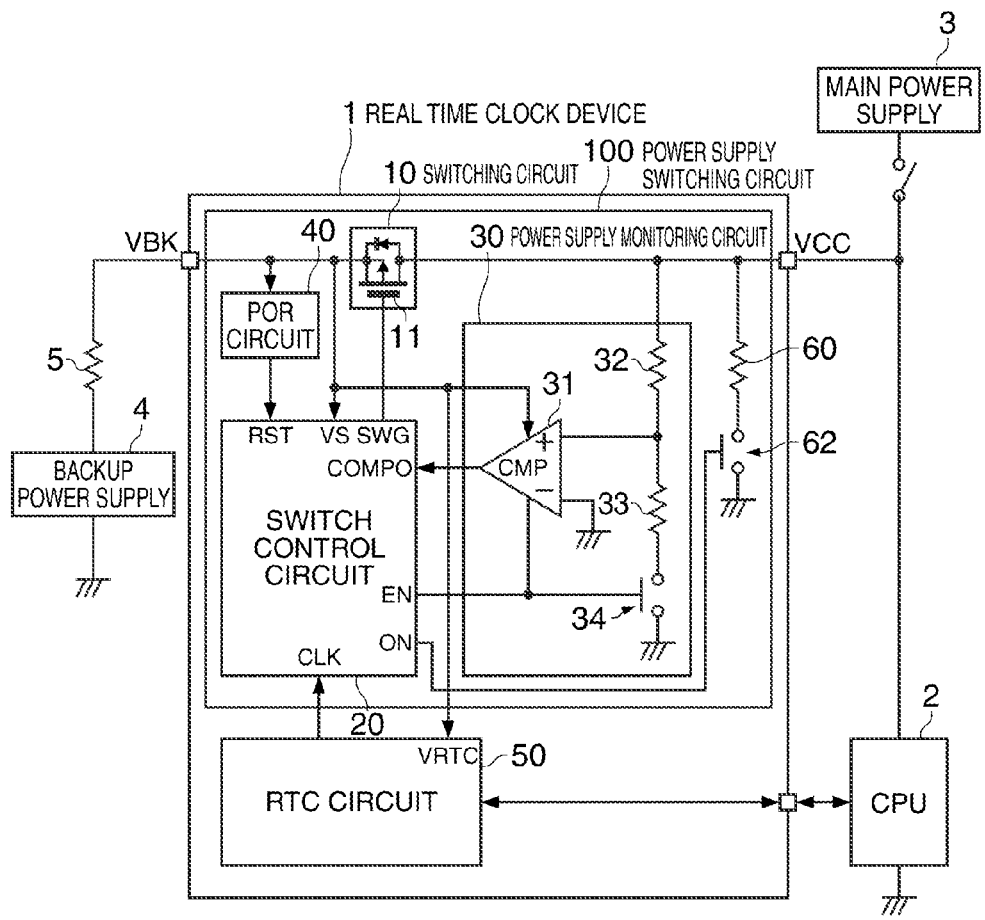
FIG. 14 shows a configuration example of a real time clock device of a modified example.
Figure 15:
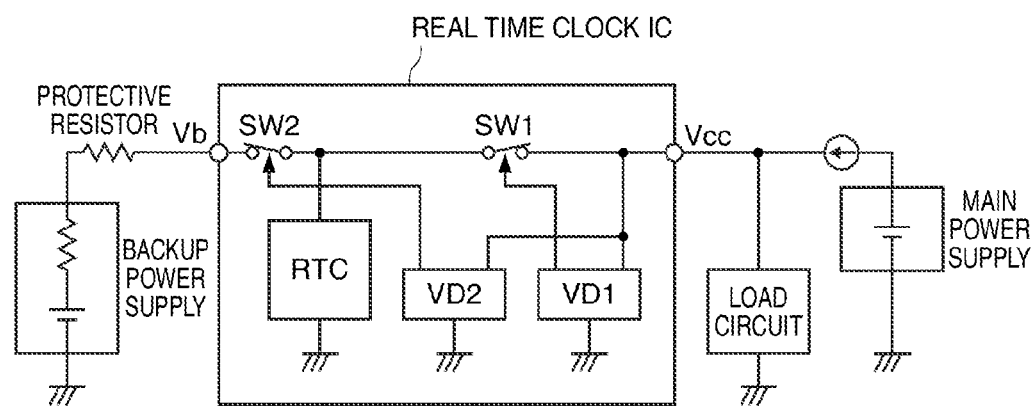
FIG. 15 is a configuration diagram of a backup power supply circuit of related art.

For example, as shown in FIG. 14, in the power supply switching circuit 100 of the real time clock device 1 of the first embodiment, a modification may be made such that a pull-down resistor 60 and a switch 62 are series-connected between the VCC terminal and the ground, and the switch control circuit 20 controls the times of connection/opening of the switch 62. For example, the switch control circuit 20 may perform control such that the switch 62 is connected at the same time with the enable signal EN, i.e., when the power supply monitoring circuit 30 is connected (when the internal state is the standby state 2 or the normal state 2).

In this manner, the switch 62 is intermittently connected or opened and the charge of the VDD terminal is forcibly discharged at regular intervals via the pull-down resistor 60, and thereby, if the main power supply is shut down, the balance between the current flowing into the VCC terminal and the current flowing out to the ground via the load of the CPU2 or the like is easily lost and the voltage reduction of the VCC terminal is further promoted. As a result, the voltage reduction of the VCC terminal may be reliably detected by the power supply monitoring circuit 30 and the mode may be shifted to the backup mode more quickly.

Further, the switch 62 is intermittently connected/opened, and thereby, the current consumption by the pull-down resistor 60 may be made lower than that in the case without the switch 62. Note that the switch control circuit 20 may perform control such that the switch 62 is connected only when the internal state is the normal state 2. In this manner, the current consumption by the pull-down resistor 60 may be made even lower.

Note that, though the illustration and explanation are omitted, the same modification may be applied to the power supply switching circuit 200 of the real time clock device 1 of the second embodiment.

The invention includes substantially the same configurations (for example, configurations having the same functions, methods, and results or configurations having the same purposes and advantages) as the configurations explained in the embodiments. Further, the invention includes configurations in which not-essential parts of the configurations explained in the embodiments are replaced. Furthermore, the invention includes configurations that exert the same advantages or achieve the same purposes as those of the configurations explained in the embodiments. In addition, the invention includes configurations in which known technologies are added to the configurations explained in the embodiments.

The entire disclosure of Japanese Patent Application No. 2012-153570, filed Jul. 9, 2012 is expressly incorporated by reference herein.

What is claimed is:

1. A power supply switching circuit comprising:
   a first power supply node configured to electrically couple to a first power supply;
   a second power supply node electrically coupled to a second power supply;
   a power supply monitoring circuit that intermittently monitors a voltage at the first power supply node;
   a switching circuit that connects and disconnects the first power supply node and the second power supply node; and
   a switch control circuit that switches a mode from a first mode to a second mode according to an output signal of the power supply monitoring circuit, wherein:
   the switch control circuit controls the power supply monitoring circuit to have the power supply monitoring circuit intermittently monitor the voltage at the first power supply node by intermittently providing an enable signal to turn on the power supply monitoring circuit,
   in the first mode, the first power supply node supplies power to a load, the switching circuit intermittently connects the first power supply node and the second power supply node, the power supply monitoring circuit is enabled to monitor the voltage at the first power supply node when the switch circuit is open to disconnect the second power supply node and the first power supply, and the power supply monitoring circuit is disabled from monitoring of the voltage at the first power supply node when the switch circuit is closed to connect the second power supply node and the first power supply, and
   in the second mode, the switching circuit disconnects the first power supply node and the second power supply node, the power supply monitoring circuit is intermittently enabled to monitor the voltage at the first power supply node for a predetermined time period, and the second power supply node supplies power to the load.

2. The power supply switching circuit according to claim 1, wherein the voltage of the first power supply node is monitored when the switching circuit disconnects the first power supply node and the second supply node, and, if the voltage of the first power supply node is equal to or smaller than a voltage having a desired value, the mode is switched to the second mode and the voltage of the second power supply node is output to the load.

3. The power supply switching circuit according to claim 1, wherein the switching circuit includes a first switch element having a parasitic diode,
   the first switch element is provided with an anode side of the parasitic diode at the first power supply node side and a cathode side of the parasitic diode at the second power supply node side.

4. The power supply switching circuit according to claim 1, further comprising a pull-down resistor electrically connected to the first power supply node.

5. The power supply switching circuit according to claim 1,
   wherein the switching circuit serves as a first switching circuit,
   the power supply switching circuit further comprises a second switching circuit that electrically connects the second power supply node and a third power supply node in a connected state, and
   the switch control circuit intermittently connects both the first switching circuit and the second switching circuit in the first mode, and opens the first switching circuit and connects the second switching circuit in the second mode.

6. The power supply switching circuit according to claim 5, wherein the power supply monitoring circuit is a first power supply monitoring circuit, the power supply switching circuit further comprises a second power supply monitoring circuit that monitors a voltage of the third power supply node,
   wherein the control circuit switches the mode from the first mode to a third mode in which the first switching circuit connects the first power supply node and the second power supply node and the second switching circuit is open according to an output signal of the second power supply monitoring circuit.

7. The power supply switching circuit according to claim 6, further comprising a third power supply monitoring circuit that monitors a magnitude relationship between the voltage of the first power supply node and the voltage of the third power supply node,
   wherein the control circuit switches the mode from the first mode to the third mode according to an output signal of the third power supply monitoring circuit.

8. The power supply switching circuit according to claim 5, wherein the second switching circuit includes a second switch element and a third switch element having parasitic diodes,
   the second switch element is provided with an anode side of the parasitic diode at the second power supply node side and a cathode side at the third power supply node side,
   the third switch element is provided in series with the second switch element with an anode side of the parasitic diode at the third power supply node side and a cathode side at the second power supply node side, and
   the switch control circuit connects both the second switch element and the third switch element for connecting the second switching circuit and opens the second switch element and connects the third switch element for opening the second switching circuit in the first mode.

9. A real time clock device comprising:
   the power supply switching circuit according to claim 1; and
   a real time clock circuit to which an output voltage of the power supply switching circuit is supplied as a power supply voltage.

10. An electronic apparatus comprising:
the power supply switching circuit according to claim 1;
a first power supply that supplies a power supply voltage to the first power supply node; and
a second power supply electrically connected to the second power supply node.

11. A mobile unit comprising:
the power supply switching circuit according to claim 1;
a first power supply that supplies a power supply voltage to the first power supply node; and
a second power supply electrically connected to the second power supply node.

12. A method of controlling a power supply switching circuit including a power supply monitoring circuit that monitors a voltage of a first power supply node when the power supply monitoring circuit receives an enable signal to turn on the power supply monitoring circuit and a switching circuit that electrically connects and disconnects the first power supply node and a second power supply node, wherein the first supply node is configured to connect to a first power source and the second power supply node is connected to a second power source, the method comprising:
switching a mode from a first mode to a second mode according to an output signal of the power supply monitoring circuit, wherein in the first mode, the switching circuit intermittently connects the first power supply node and the second power supply node and the first power supply node supplies a voltage to a load, and in the second mode, the switching circuit disconnects the first power supply node and the second power supply node, and the second power supply node supplies a voltage to the load;
in the second mode, intermittently providing the enable signal to the power supply monitoring circuit to monitor the voltage at the first power supply node for a predetermined time period;
in the first mode, providing the enable signal to the power supply monitoring circuit to monitor the voltage at the first power supply node in response to the switching circuit being open to disconnect the second power supply node and the first power supply; and
in the first mode, not providing the enable signal to the power supply monitoring circuit to disable monitoring the voltage at the first power supply node in response to the switching circuit being closed to connect the second power supply node and the first power supply during the first mode.

* * * * *